(12) United States Patent
Kim et al.

(10) Patent No.: US 9,635,693 B2
(45) Date of Patent: Apr. 25, 2017

(54) METHOD OF PERFORMING PAIRING BETWEEN COORDINATOR AND DEVICE IN NETWORK, METHOD OF PERFORMING PAIRING BETWEEN DEVICES, METHOD OF PAIRING BETWEEN COORDINATORS AND NETWORK SYSTEM INCLUDING THE COORDINATORS AND THE DEVICES

(75) Inventors: Ho-dong Kim, Seoul (KR); Hae-young Jun, Seoul (KR); Hyuk-choon Kwon, Seoul (KR); Soo-yeon Jung, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 967 days.

(21) Appl. No.: 13/102,656

(22) Filed: May 6, 2011

(65) Prior Publication Data

US 2011/0276665 A1 Nov. 10, 2011

Related U.S. Application Data

(60) Provisional application No. 61/332,316, filed on May 7, 2010, provisional application No. 61/332,285, filed (Continued)

(30) Foreign Application Priority Data

Nov. 18, 2010 (KR) ........................ 10-2010-0115121

(51) Int. Cl.
*G06F 15/16* (2006.01)
*H04W 76/02* (2009.01)
*H04W 76/04* (2009.01)
*H04L 12/46* (2006.01)
*H04L 29/06* (2006.01)
*H04W 8/00* (2009.01)
*H04W 84/18* (2009.01)

(52) U.S. Cl.
CPC ....... *H04W 76/023* (2013.01); *H04W 76/028* (2013.01); *H04W 76/04* (2013.01); (Continued)

(58) Field of Classification Search
CPC ......... H04L 67/00; H04L 47/70; H04L 45/34; H04L 63/0492
(Continued)

(56) References Cited

U.S. PATENT DOCUMENTS 7,916,663 B2 * 3/2011 Yee .................... H04W 76/025
370/254
7,948,925 B2 * 5/2011 Miyabayashi ...... H04L 63/0492
370/295
(Continued)

FOREIGN PATENT DOCUMENTS

KR 10-2005-0096985 A 10/2005

OTHER PUBLICATIONS

Communication dated Dec. 2, 2016, issued by the Korean Intellectual Property Office in counterpart Korean application No. 10-2010-0115121.

*Primary Examiner* — Kristie Shingles
(74) *Attorney, Agent, or Firm* — Sughrue Mion, PLLC

(57) ABSTRACT

Provided are methods and apparatuses for performing pairing. A method of performing pairing between a coordinator and a peer device includes: if a second coordinator of a second network relays first pairing information indicating that a first coordinator of a first network is a device to perform pairing, from the first coordinator to a peer device of the second network, disassociating, by the peer device, from the second network, associating with the first network, and then transmitting, to the first coordinator, the first pairing information and second pairing information indicating that the peer device is a peer device to perform pairing.

23 Claims, 18 Drawing Sheets

Related U.S. Application Data on May 7, 2010, provisional application No. 61/332,272, filed on May 7, 2010.

(52) U.S. Cl.
CPC ...... *H04L 12/4633* (2013.01); *H04L 65/1069* (2013.01); *H04W 8/005* (2013.01); *H04W 84/18* (2013.01)

(58) Field of Classification Search
USPC ................................................ 709/217, 220
See application file for complete search history.

(56) References Cited

U.S. PATENT DOCUMENTS

| | | | | |
|---|---|---|---|---|
| 8,228,861 | B1 * | 7/2012 | Nix ................................ | 370/329 |
| 8,699,377 | B2 * | 4/2014 | Veillette .................. | H04L 45/34 |
| | | | | 370/254 |
| 8,891,497 | B1 * | 11/2014 | Vleugels ........................ | 370/338 |
| 2005/0239456 | A1 * | 10/2005 | Sung et al. .................... | 455/427 |
| 2006/0057963 | A1 * | 3/2006 | Lee ................ | 455/41.2 |
| 2006/0058029 | A1 * | 3/2006 | Lee et al. .................... | 455/435.1 |
| 2006/0168205 | A1 * | 7/2006 | Barron et al. ................. | 709/224 |
| 2006/0187878 | A1 * | 8/2006 | Calhoun et al. .............. | 370/331 |
| 2006/0191000 | A1 * | 8/2006 | O'Hara et al. .................. | 726/12 |
| 2008/0250294 | A1 * | 10/2008 | Ngo et al. ...................... | 714/752 |
| 2008/0304458 | A1 * | 12/2008 | Aghvami .............. | H04W 48/16 |
| | | | | 370/338 |
| 2009/0046732 | A1 * | 2/2009 | Pratt et al. .................... | 370/406 |
| 2010/0061355 | A1 | 3/2010 | Tsuchiya | |
| 2010/0217822 | A1 * | 8/2010 | Katis et al. .................... | 709/206 |
| 2011/0022812 | A1 * | 1/2011 | van der Linden et al. ... | 711/163 |
| 2011/0258327 | A1 * | 10/2011 | Phan .................. | H04W 76/023 |
| | | | | 709/227 |
| 2012/0106397 | A1 * | 5/2012 | Abedi .............. | H04W 74/0875 |
| | | | | 370/255 |

* cited by examiner

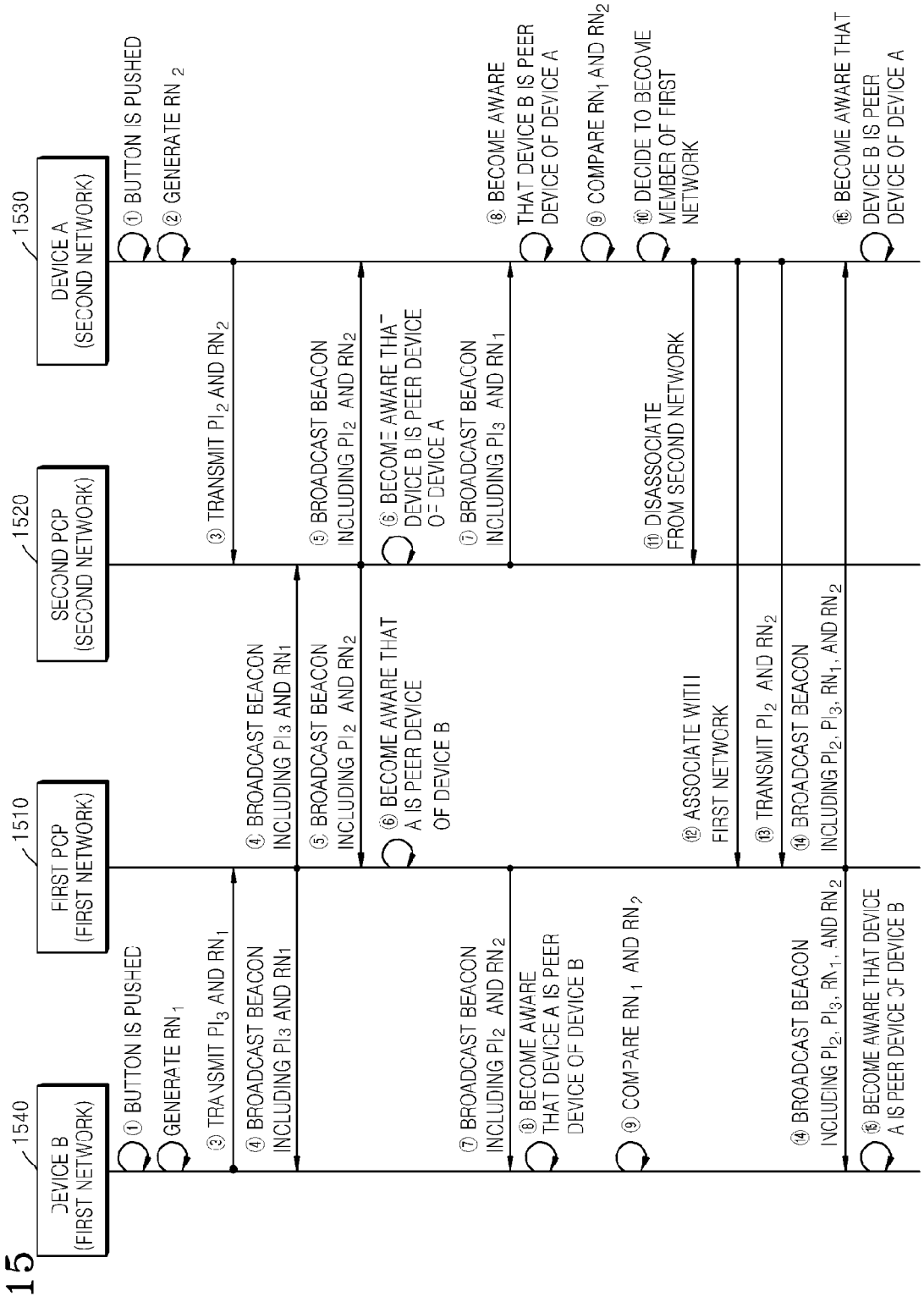

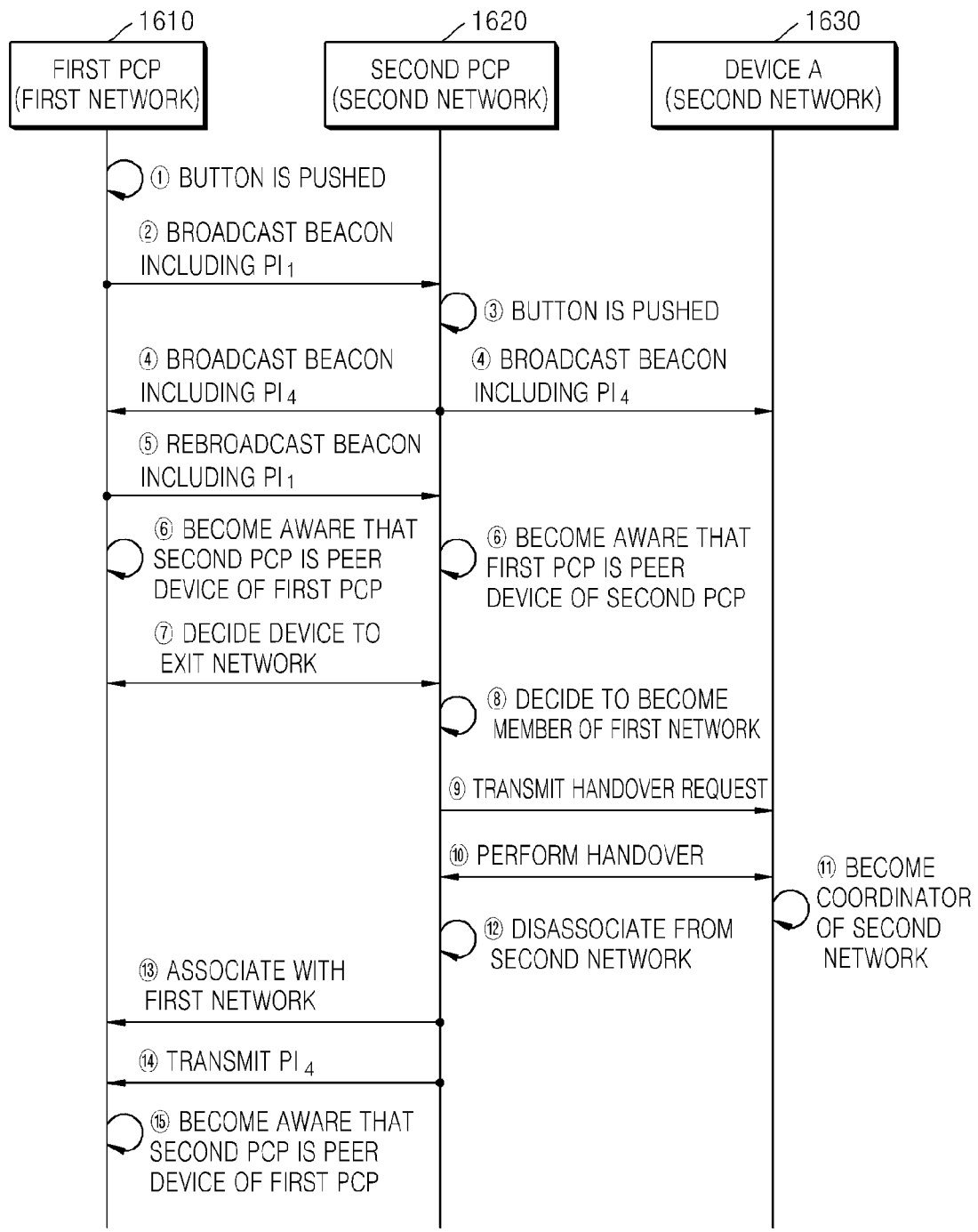

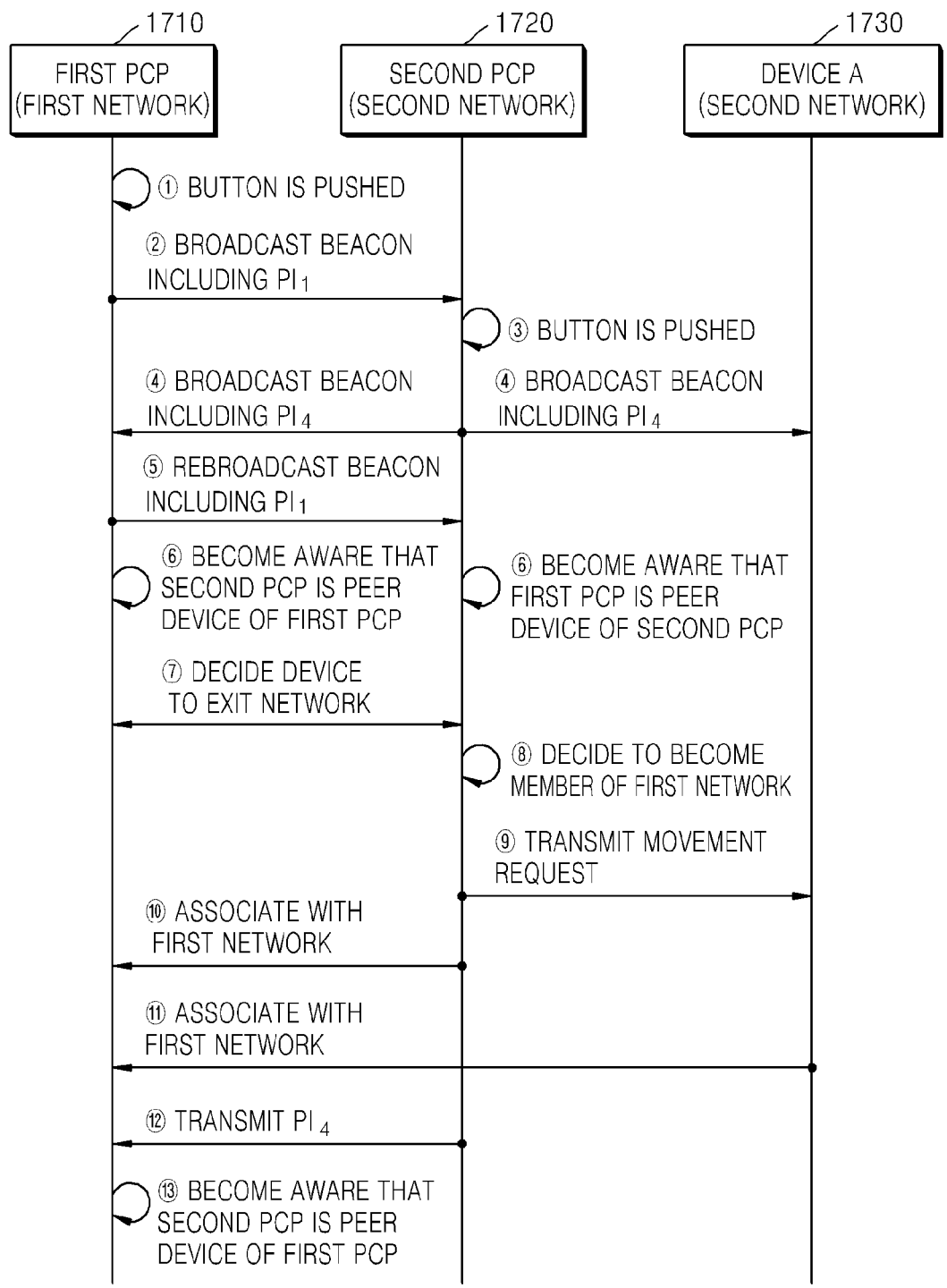

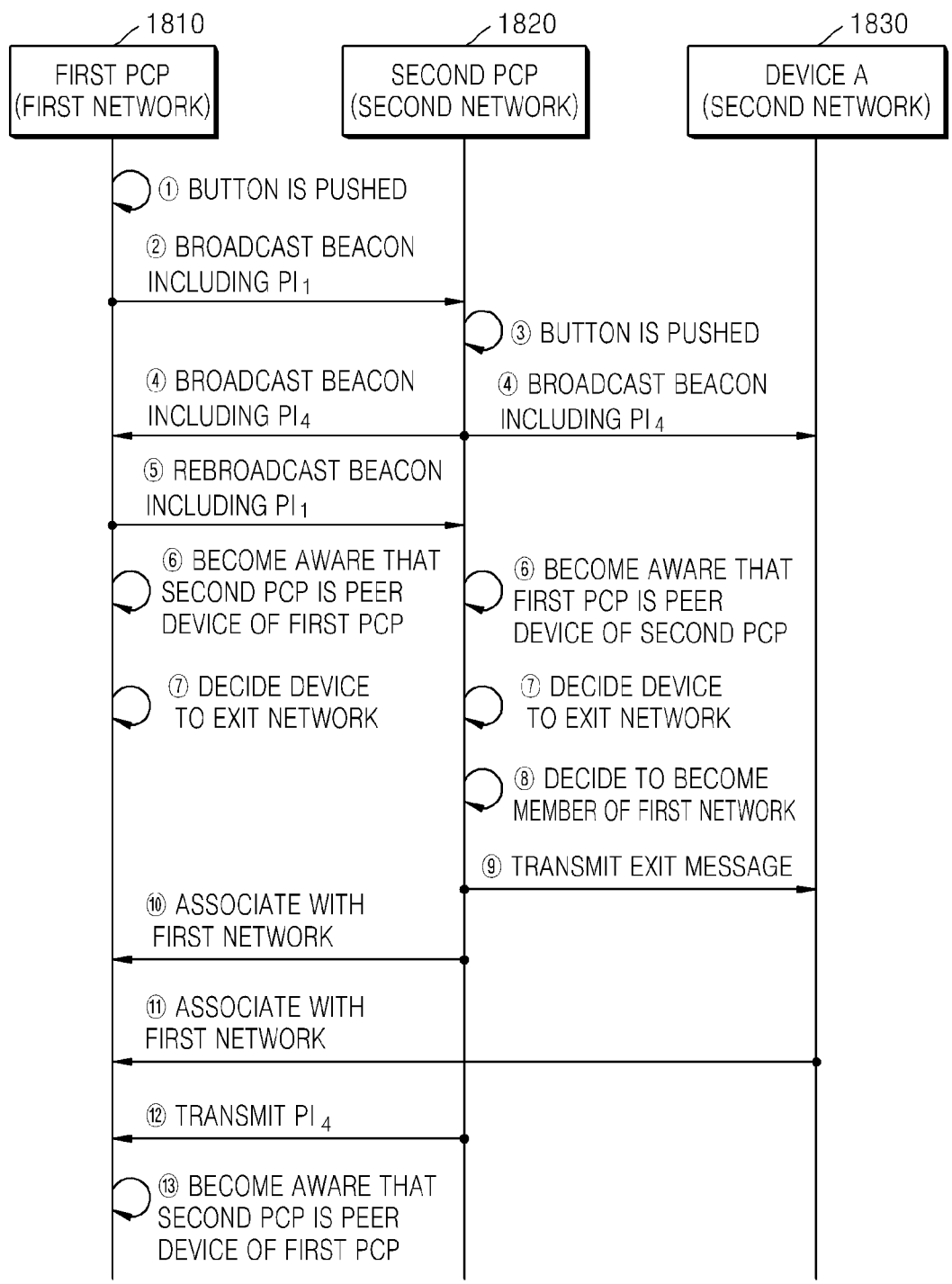

METHOD OF PERFORMING PAIRING BETWEEN COORDINATOR AND DEVICE IN NETWORK, METHOD OF PERFORMING PAIRING BETWEEN DEVICES, METHOD OF PAIRING BETWEEN COORDINATORS AND NETWORK SYSTEM INCLUDING THE COORDINATORS AND THE DEVICES

CROSS-REFERENCE TO RELATED PATENT APPLICATIONS

This application claims the benefit of U.S. Provisional Application No. 61/332,272, filed on May 7, 2010, U.S. Provisional Application No. 61/332,316, filed on May 7, 2010, and U.S. Provisional Application No. 61/332,285, filed on May 7, 2010, and claims priority from Korean Patent Application No. 10-2010-0115121, filed on Nov. 18, 2010 in the Korean Intellectual Property Office, the disclosures of which are incorporated herein in their entireties by reference.

BACKGROUND

1. Field

Apparatuses and methods consistent with exemplary embodiments relate to performing pairing between a coordinator and a device in a network, performing pairing between devices, performing pairing between coordinators, and a network system including the coordinators and the devices.

2. Description of the Related Art

Recently, a variety of near field communication methods, such as Wi-Fi, Bluetooth and the like, have been widely used as communication protocols between devices. In such near field communication methods, a communication protocol between devices can be more easily set by using Wi-Fi Direct, Wi-Fi Protected Setup (WPS), or the like. In this regard, setting of a communication protocol so as to perform communication between devices is referred to as pairing.

Also, a communication method using a 60 GHz frequency band so as to perform large-capacity high-speed transmission has been identified as an extended type of Wi-Fi communication method. A method of performing pairing between devices is needed in the communication method using a 60 GHz frequency band.

SUMMARY

Exemplary embodiments provide a method of performing pairing between a coordinator and a device in a network, a method of performing pairing between devices, a method of performing pairing between coordinators, and a network system including the coordinators and the devices.

According to an aspect of an exemplary embodiment, there is provided a method of performing pairing between a first coordinator of a first network and a peer device of a second network by using a second coordinator of the second network, the method including: the second coordinator relaying first pairing information indicating that the first coordinator is a device to perform pairing, from the first coordinator to the peer device; the peer device disassociating from the second network; the peer device associating with the first network; and the peer device transmitting the first pairing information, and second pairing information indicating that the peer device is a peer device to perform pairing, to the first coordinator.

The relaying the first pairing information may include: the first coordinator broadcasting a beacon including the first pairing information or the first pairing information; and the second coordinator that receives the broadcasted beacon including the first pairing information or the first pairing information, broadcasting the beacon including the first pairing information or the first pairing information, wherein the peer device does not receive the beacon including the first pairing information or the first pairing information broadcasted by the first coordinator but receives the beacon including the first pairing information or the first pairing information broadcasted by the second coordinator.

The disassociating the peer device from the second network may include: the peer device transmitting a disassociation request to disassociate from the second network, to the second network; and the second coordinator transmitting a disassociation response that approves the disassociation request, to the peer device.

The associating the peer device with the first network may include: the peer device transmitting an association request to associate with the first network, to the first coordinator; and the first coordinator transmitting an association response that approves the association request, to the peer device.

The first pairing information may include at least one of first Push Button Configuration (PBC) information indicating that a button for instructing to perform pairing has been pushed in the first coordinator, and a media access control (MAC) address of the first coordinator, and the second pairing information may include at least one of second PBC information indicating that a button for instructing to perform pairing has been pushed in the peer device, and an MAC address of the peer device.

The first pairing information may further include at least one between an identifier of the first network and coordinator role information indicating that the first coordinator is a coordinator of the first network.

According to an aspect of another exemplary embodiment, there is provided a method of performing pairing between a first coordinator of a first network and a peer device of a second network by using a second coordinator of the second network, the method including: the second coordinator relaying first pairing information indicating that the first coordinator is a device to perform pairing, from the first coordinator to the peer device; the second coordinator relaying the first pairing information, and second pairing information indicating that the peer device is a peer device to perform pairing, from the peer device to the first coordinator; the peer device disassociating from the second network; and the peer device associating with the first network.

The relaying the first pairing information may include: the first coordinator broadcasting a beacon including the first pairing information or the first pairing information; and the second coordinator that receives the broadcasted beacon including the first pairing information or the first pairing information, broadcasting the beacon including the first pairing information or the first pairing information, wherein the peer device does not receive the beacon including the first pairing information or the first pairing information broadcasted by the first coordinator but receives the beacon including the first pairing information or the first pairing information broadcasted by the second coordinator.

The relaying the first pairing information and the second pairing information may include: the peer device transmitting the first pairing information and the second pairing information to the second coordinator; and the second coordinator transmitting the first pairing information and the second pairing information to the first coordinator.

According to an aspect of another exemplary embodiment, there is provided a method of performing pairing between a first coordinator of a first network and a peer device of a second network, the method including: broadcasting a beacon including first pairing information indicating that the first coordinator is a device to perform pairing, or the first pairing information; the peer device disassociating from the second network; the peer device associating with the first network; and the peer device transmitting the first pairing information, and second pairing information indicating that the peer device is a peer device to perform pairing, to the first coordinator.

The second network may further include a second coordinator, and if the peer device does not receive any message from the first coordinator or the second coordinator within a predetermined amount of time, the peer device may transmit a failure message to the second coordinator, and if the failure message is received, the second coordinator may transmit the failure message to the first coordinator.

According to an aspect of another exemplary embodiment, there is provided a method of performing pairing between a first coordinator of a first network and a peer device of a second network by using a second coordinator of the second network, the method including: the second coordinator relaying second pairing information indicating that the peer device is a device to perform pairing, from the peer device to the first coordinator; the second coordinator relaying the second pairing information, and first pairing information indicating that the first coordinator is a peer device to perform pairing, from the first coordinator to the peer device; the peer device disassociating from the second network; and the peer device associating with the first network.

The relaying the second pairing information from the peer device to the first coordinator may include: the peer device transmitting the second pairing information to the second coordinator; and the second coordinator transmitting the second pairing information to the first coordinator.

The relaying the first pairing information and the second pairing information from the first coordinator to the peer device may include: the first coordinator broadcasting a beacon including the first pairing information and the second pairing information, or the first pairing information and the second pairing information; and the second coordinator that receives the broadcasted beacon including the first pairing information and the second pairing information, or the first pairing information and the second pairing information, broadcasting the beacon including the first pairing information and the second pairing information, or the first pairing information and the second pairing information, wherein the peer device does not receive the beacon including the first pairing information and the second pairing information, or the first pairing information and the second pairing information broadcasted by the first coordinator but receives the beacon including the first pairing information and the second pairing information, or the first pairing information and the second pairing information broadcasted by the second coordinator.

According to an aspect of another exemplary embodiment, there is provided a method of performing pairing between a first coordinator of a first network and a peer device of a second network by using a second coordinator of the second network, the method including: the first coordinator broadcasting a beacon including first pairing information indicating that the first coordinator is a device to perform pairing, or the first pairing information; the second coordinator relaying the first pairing information, and second pairing information indicating that the peer device is a peer device to perform pairing, from the peer device to the first coordinator; and the first coordinator associating with the second network.

The relaying the first pairing information and the second pairing information may include: the peer device transmitting the first pairing information and the second pairing information to the second coordinator; and the second coordinator transmitting the first pairing information and the second pairing information to the first coordinator.

The associating the first coordinator with the second network may include: the first coordinator transmitting an association request to associate with the second network to the second coordinator; and the second coordinator transmitting an association response that approves the association request, to the first coordinator.

The method may further include: the first coordinator transmitting an exit message indicating that the first coordinator plans to exit the first network, to at least one device that belongs to the first network; and the first coordinator disassociating from the first network.

The method may further include: the first coordinator transmitting a handover request to hand over a coordinator role of the first network, to one of devices that belong to the first network; a device that receives the handover request transmitting a handover response that approves the handover request, to the first coordinator; and the first coordinator disassociating from the first network.

The method may further include: the first coordinator transmitting a movement request to move to the second network, to one of devices that belong to the first network; a device of the first network that receives the movement request transmitting a movement response that approves the movement request, to the first coordinator; and the device that receives the movement request associating with the second network.

According to an aspect of another exemplary embodiment, there is provided a method of performing pairing between a first device of a first network and a second device of a second network by using a first coordinator of the first network and a second coordinator of the second network, the method including: the first coordinator and the second coordinator relaying third pairing information indicating that the first device is a device to perform pairing, from the first device to the second device; the first coordinator and the second coordinator relaying second pairing information indicating that the second device is a peer device to perform pairing, from the second device to the first device; the second device disassociating from the second network; and the second device associating with the first network.

The method may further include: the second device that associates with the first network transmitting the second pairing information to the first coordinator; and the first coordinator broadcasting a beacon including the second pairing information and the third pairing information, or the second pairing information and the third pairing information.

The relaying the third pairing information to the second device may include: the first device transmitting the third pairing information to the first coordinator; the first coordinator broadcasting a beacon including the third pairing information or the third pairing information; and the second coordinator that receives the third pairing information transmitting the third pairing information to the second device, wherein the second device does not receive the beacon including the third pairing information or the third pairing information broadcasted by the first coordinator but receives the beacon including the third pairing information or the third pairing information broadcasted by the second coordinator.

The relaying the second pairing information to the first device may include: the second device transmitting the second pairing information to the second coordinator; the second coordinator broadcasting a beacon including the second pairing information or the second pairing information; and the first coordinator that receives the second pairing information transmitting the second pairing information to the first device, wherein the first device does not receive the beacon including the second pairing information or the second pairing information broadcasted by the second coordinator but receives the beacon including the second pairing information or the second pairing information broadcasted by the first coordinator.

The second pairing information may include second Push Button Configuration (PBC) information indicating that a button for instructing to perform pairing has been pushed in the second device, and an MAC address of the second device, and the third pairing information may include third PBC information indicating that a button for instructing to perform pairing has been pushed in the first device, and an MAC address of the first device.

According to an aspect of another exemplary embodiment, there is provided a method of performing pairing between a first device of a first network and a second device of a second network by using a first coordinator of the first network and a second coordinator of the second network, the method including: each of the first coordinator and the second coordinator comparing a capability of the first coordinator and a capability of the second coordinator based on first coordinator capability information indicating the capability of the first coordinator and second coordinator capability information indicating the capability of the second coordinator; the second device disassociating from the second network based on a result of comparison and then associating with the first network; the second device transmitting second pairing information indicating that the second device is a device to perform pairing, to the first coordinator; and the first coordinator broadcasting third pairing information indicating that the first device is a device to perform pairing and the second pairing information.

The comparing the capability of the first coordinator and the capability of the second coordinator may include: the first device transmitting the third pairing information to the first coordinator; the second device transmitting the second pairing information to the second coordinator; the first coordinator broadcasting a beacon including the third pairing information and the first coordinator capability information, or the third pairing information and the first coordinator capability information; and the second coordinator broadcasting a beacon including the second pairing information and the second coordinator capability information, or the second pairing information and the second coordinator capability information.

The disassociating the second device from the second network based on the result of comparison and then the associating of the second device with the first network may include: each of the first coordinator and the second coordinator deciding the first coordinator as a selected coordinator that is a coordinator having a better coordinator capability between the first coordinator and the second coordinator based on the result of comparison; the first coordinator transmitting network information about the first network to which the selected coordinator belongs, and the second pairing information to the first device; the second coordinator transmitting network information about the first network and the third pairing information to the second device; the second device disassociating from the second network; and the second device associating with the first network based on the network information about the first network.

The deciding the first coordinator as the selected coordinator may be performed based on a maximum number of devices that can be controlled by each of the first and second coordinators, the number of devices that are being controlled by the first and second coordinators, and information regarding whether power is supplied to each of the first and second coordinators by using a battery.

The transmitting the network information about the first network and the third pairing information to the second device may include transmitting to the second device a movement request that includes the network information about the first network and the third pairing information to request the second device to move to the first network.

According to an aspect of another exemplary embodiment, there is provided a method of performing pairing between a first device of a first network and a second device of a second network by using a first coordinator of the first network and a second coordinator of the second network, the method including: each of the first device and the second device comparing a capability of the first coordinator and a capability of the second coordinator based on first coordinator capability information indicating the capability of the first coordinator and second coordinator capability information indicating the capability of the second coordinator; the second device disassociating from the second network based on a result of comparison and then associating with the first network; the second device transmitting second pairing information indicating that the second device is a device to perform pairing, to the first coordinator; and the first coordinator broadcasting third pairing information indicating that the first device is a device to perform pairing and the second pairing information.

The comparing the capability of the first coordinator and the capability of the second coordinator may include: the first device transmitting the third pairing information to the first coordinator; the second device transmitting the second pairing information to the second coordinator; the first coordinator broadcasting a beacon including the third pairing information and the first coordinator capability information, or the third pairing information and the first coordinator capability information; the second coordinator broadcasting a beacon including the second pairing information and the second coordinator capability information, or the second pairing information and the second coordinator capability information; the first coordinator broadcasting a beacon including the second pairing information and the second coordinator capability information, or the second pairing information and the second coordinator capability information; and the second coordinator broadcasting a beacon including the third pairing information and the first coordinator capability information, or the third pairing information and the first coordinator capability information.

The disassociating the second device from the second network based on the result of comparison and then the associating of the second device with the first network may include: each of the first device and the second device deciding the first coordinator as a selected coordinator that is a coordinator having a better coordinator capability between the first coordinator and the second coordinator based on the result of comparison; the second device disassociating from the second network; and the second device associating with the first network to which the selected coordinator belongs.

According to an aspect of another exemplary embodiment, there is provided a method of performing pairing between a first device of a first network and a second device of a second network by using a first coordinator of the first network and a second coordinator of the second network, the method including: each of the first coordinator and the second coordinator comparing a first random number generated by the first device and a second random number generated by the second device; the second device disassociating from the second network based on a result of comparison and then associating with the first network; the second device transmitting second pairing information indicating that the second device is a device to perform pairing, to the first coordinator; and the first coordinator broadcasting third pairing information indicating that the first device is a device to perform pairing and the second pairing information.

The comparing of the first random number and the second random number may include: the first device transmitting the first random number and the third pairing information to the first coordinator after generating the first random number; the second device transmitting the second random number and the second pairing information to the second coordinator after generating the second random number; the first coordinator broadcasting a beacon including the third pairing information and the first random number, or the third pairing information and the first random number; and the second coordinator broadcasting a beacon including the second pairing information and the second random number, or the second pairing information and the second random number.

The disassociating the second device from the second network based on the result of comparison and then the associating of the second device with the first network may include: each of the first coordinator and the second coordinator deciding the first network as a selected network based on the result of comparison; the first coordinator transmitting network information about the first network and the second pairing information to the first device; the second coordinator transmitting network information about the first network and the third pairing information to the second device; the second device disassociating from the second network; and the second device associating with the first network based on the network information about the first network.

According to an aspect of another exemplary embodiment, there is provided a method of performing pairing between a first device of a first network and a second device of a second network by using a first coordinator of the first network and a second coordinator of the second network, the method including: each of the first device and the second device comparing a first random number generated by the first device and a second random number generated by the second device; the second device disassociating from the second network based on a result of comparison and then associating with the first network; the second device transmitting second pairing information indicating that the second device is a device to perform pairing, and the second random number to the first coordinator; and the first coordinator broadcasting third pairing information indicating that the first device is a device to perform pairing, the second pairing information, the first random number, and the second random number.

The comparing the first random number and the second random number may include: the first device transmitting the first random number and the third pairing information to the first coordinator after generating the first random number; the second device transmitting the second random number and the second pairing information to the second coordinator after generating the second random number; the first coordinator broadcasting a beacon including the third pairing information and the first random number, or the third pairing information and the first random number; the second coordinator broadcasting a beacon including the second pairing information and the second random number, or the second pairing information and the second random number; the first coordinator broadcasting a beacon including the second pairing information and the second random number, or the second pairing information and the second random number; and the second coordinator broadcasting a beacon including the third pairing information and the first random number, or the third pairing information and the first random number.

According to an aspect of another exemplary embodiment, there is provided a method of performing pairing between a first coordinator of a first network and a second coordinator of a second network, the method including: the second coordinator broadcasting a beacon including fourth pairing information indicating that the second coordinator is a device to perform pairing, or the fourth pairing information; the first coordinator broadcasting a beacon including first pairing information indicating that the first coordinator is a device to perform pairing, or the first pairing information; deciding a device to exit a network to which the first coordinator or the second coordinator belongs, between the first coordinator and the second coordinator; and the second coordinator disassociating from the second network based on a decision and then associating with the first network.

The disassociating the second coordinator from the second network based on a decision and then the associating of the second coordinator with the first network may include: the second coordinator transmitting a handover request to hand over coordinator role of the second coordinator to another device, to one from among devices of the second network; the device of the second network that receives the handover request, transmitting a handover response that approves the handover request, to the second coordinator; and the device of the second network that transmits the handover response, becoming a coordinator of the second network.

The method may further include: the second coordinator transmitting a movement request to move to the first network, to one of the devices that belong to the second network; and the device of the second device that receives the movement request, associating with the first network.

The method may further include: the second coordinator transmitting an exit message indicating that the second coordinator plans to exit the second network, to the devices that belong to the second network; and at least one of the devices of the second network that receives the exit message, associating with the first network.

According to an aspect of another exemplary embodiment, there is provided a network system including: a first coordinator belonging to a first network and broadcasting a beacon including first pairing information indicating that the first coordinator is a device to perform pairing, or the first pairing information; a peer device belonging to a second network and generating second pairing information indicating that the peer device is a peer device to perform pairing; and a second coordinator belonging to the second network and relaying the first pairing information from the first coordinator to the peer device, wherein, if the first pairing information is received, the peer device disassociates from the second network, associates with the first network and then transmits the first pairing information and the second pairing information to the first coordinator.

According to an aspect of another exemplary embodiment, there is provided a network system including: a first coordinator belonging to a first network and broadcasting a beacon including first pairing information indicating that the first coordinator is a device to perform pairing, or the first pairing information; a peer device belonging to a second network and generating second pairing information indicating that the peer device is a peer device to perform pairing; and a second coordinator belonging to the second network and relaying the first pairing information from the first coordinator to the peer device and relaying the first pairing information and the second pairing information from the peer device to the first coordinator, wherein the peer device transmits the first pairing information and the second pairing information to the second coordinator and then disassociates from the second network and associates with the first network.

According to an aspect of another exemplary embodiment, there is provided a network system including: a first coordinator belonging to a first network and broadcasting a beacon including first pairing information indicating that the first coordinator is a device to perform pairing, or the first pairing information; and a peer device belonging to a second network and, if the first pairing information is received, disassociating from the second network and associating with the first network and then transmitting the first pairing information and second pairing information indicating that the peer device is a peer device to perform pairing, to the first coordinator.

According to an aspect of another exemplary embodiment, there is provided a network system including: a peer device belonging to a second network and generating second pairing information indicating that the peer device is a device to perform pairing; a second coordinator belonging to the second network and relaying the second pairing information from the peer device to a first coordinator of a first network; and a first coordinator broadcasting the second pairing information and first pairing information indicating that the first coordinator is a peer device to perform pairing, wherein the second coordinator relays the first pairing information and the second pairing information from the first coordinator to the peer device, and if the peer device receives the first pairing information and the second pairing information from the second coordinator, the peer device disassociates from the second network and associates with the first network.

According to an aspect of another exemplary embodiment, there is provided a network system including: a first coordinator belonging to a first network and broadcasting a beacon including first pairing information indicating that the first coordinator is a device to perform pairing, or the first pairing information; a peer device belonging to a second network and generating second pairing information indicating that the peer device is a peer device to perform pairing; and a second coordinator belonging to the second network and relaying the first pairing information and the second pairing information from the peer device to the first coordinator, wherein, if the first pairing information and the second pairing information are received, the first coordinator associates with the second network.

According to an aspect of another exemplary embodiment, there is provided a network system including: a first device belonging to a first network and generating third pairing information indicating that the first device is a device to perform pairing; a first coordinator belonging to the first network and relaying the third pairing information from the first device to a second device of a second network through a second coordinator of the second network; a second device generating second pairing information indicating that the second device is a peer device to perform pairing; and a second coordinator relaying the second pairing information from the second device to the first device through the first coordinator, wherein, if the third pairing information is received, the second device disassociates from the second network and then associates with the first network.

According to an aspect of another exemplary embodiment, there is provided a network system including: a second coordinator comparing a capability of a first coordinator and a capability of the second coordinator based on first coordinator capability information indicating the capability of the first coordinator of a first network and second coordinator capability information indicating that the capability of the second coordinator that is a coordinator of a second network; a second device belonging to the second network, disassociating from the second network based on a result of comparison, associating with the first network and then transmitting second pairing information indicating that the second device is a device to perform pairing, to the first coordinator; a first device belonging to the first network and generating third pairing information indicating that the first device is a peer device to perform pairing; and a first coordinator broadcasting the second pairing information and the third pairing information.

According to an aspect of another exemplary embodiment, there is provided a network system including: a second device comparing a capability of a first coordinator and a capability of the second coordinator based on first coordinator capability information indicating the capability of the first coordinator of a first network and second coordinator capability information indicating that the capability of the second coordinator that is a coordinator of a second network, disassociating from the second network based on a result of comparison, associating with the first network and then transmitting second pairing information indicating that the second device is a device to perform pairing; a first device belonging to the first network and generating third pairing information indicating that the first device is a device to perform pairing; and a first coordinator broadcasting the second pairing information and the third pairing information.

According to an aspect of another exemplary embodiment, there is provided a network system including: a second coordinator belonging to a second network and comparing a first random number generated by a first device that belongs to a first network and a second random number generated by a second device that belongs to the second network; a second device disassociating from the second network based on a result of comparison, associating with the first network and then transmitting second pairing information indicating that the second device is a device to perform pairing, to a first coordinator of the first network; a first device generating third pairing information indicating that the first device is a device to perform pairing; and the first coordinator broadcasting the second pairing information and the third pairing information.

According to an aspect of another exemplary embodiment, there is provided a network system including: a second device belonging to a second network, comparing a first random number generated by a first device that belongs to a first network and a second random number generated by the second device, disassociating from the second network based on a result of comparison, associating with the first network and then transmitting second pairing information indicating that the second device is a device to perform pairing and the second random number to a first coordinator of the first network; the first device generating third pairing information indicating that the first device is a peer device to perform pairing; and a first coordinator broadcasting the second pairing information, the third pairing information, the first random number, and the second random number.

According to an aspect of another exemplary embodiment, there is provided a network system including: a second coordinator belonging to a second network and broadcasting a beacon including fourth pairing information indicating that the second coordinator is a device to perform pairing, or the fourth pairing information; and a first coordinator broadcasting a beacon including first pairing information indicating that the first coordinator is a device to perform pairing, or the first pairing information, wherein each of the first coordinator and the second coordinator decides a device to exit a network to which the first coordinator or the second coordinator belongs, and the second coordinator disassociates from the second network based on a decision and then associates with the first network.

According to an aspect of another exemplary embodiment, there is provided a computer-readable recording medium having recorded thereon a computer program for executing the method of performing pairing between a first coordinator of a first network and a peer device of a second network by using a second coordinator of the second network, the method including: the second coordinator relaying first pairing information indicating that the first coordinator is a device to perform pairing, from the first coordinator to the peer device; the peer device disassociating from the second network; the peer device associating with the first network; and the peer device transmitting the first pairing information, and second pairing information indicating that the peer device is a peer device to perform pairing, to the first coordinator.

According to an aspect of another exemplary embodiment, there is provided a computer-readable recording medium having recorded thereon a computer program for executing the method of performing pairing between a first coordinator of a first network and a peer device of a second network by using a second coordinator of the second network, the method including: the second coordinator relaying first pairing information indicating that the first coordinator is a device to perform pairing, from the first coordinator to the peer device; the second coordinator relaying the first pairing information, and second pairing information indicating that the peer device is a peer device to perform pairing, from the peer device to the first coordinator; the peer device disassociating from the second network; and the peer device associating with the first network.

According to an aspect of another exemplary embodiment, there is provided a computer-readable recording medium having recorded thereon a computer program for executing the method of performing pairing between a first coordinator of a first network and a peer device of a second network, the method including: broadcasting a beacon including first pairing information indicating that the first coordinator is a device to perform pairing, or the first pairing information; the peer device disassociating from the second network; the peer device associating with the first network; and the peer device transmitting the first pairing information, and second pairing information indicating that the peer device is a peer device to perform pairing, to the first coordinator.

According to an aspect of another exemplary embodiment, there is provided a computer-readable recording medium having recorded thereon a computer program for executing the method of performing pairing between a first coordinator of a first network and a peer device of a second network by using a second coordinator of the second network, the method including: the second coordinator relaying second pairing information indicating that the peer device is a device to perform pairing, from the peer device to the first coordinator; the second coordinator relaying the second pairing information, and first pairing information indicating that the first coordinator is a peer device to perform pairing, from the first coordinator to the peer device; the peer device disassociating from the second network; and the peer device associating with the first network.

According to an aspect of another exemplary embodiment, there is provided a computer-readable recording medium having recorded thereon a computer program for executing the method of performing pairing between a first coordinator of a first network and a peer device of a second network by using a second coordinator of the second network, the method including: the first coordinator broadcasting a beacon including first pairing information indicating that the first coordinator is a device to perform pairing, or the first pairing information; the second coordinator relaying the first pairing information, and second pairing information indicating that the peer device is a peer device to perform pairing, from the peer device to the first coordinator; and the first coordinator associating with the second network.

According to an aspect of another exemplary embodiment, there is provided a computer-readable recording medium having recorded thereon a computer program for executing the method of performing pairing between a first device of a first network and a second device of a second network by using a first coordinator of the first network and a second coordinator of the second network, the method including: the first coordinator and the second coordinator relaying third pairing information indicating that the first device is a device to perform pairing, from the first device to the second device; the first coordinator and the second coordinator relaying second pairing information indicating that the second device is a peer device to perform pairing, from the second device to the first device; the second device disassociating from the second network; and the second device associating with the first network.

According to an aspect of another exemplary embodiment, there is provided a computer-readable recording medium having recorded thereon a computer program for executing the method of performing pairing between a first device of a first network and a second device of a second network by using a first coordinator of the first network and a second coordinator of the second network, the method including: each of the first coordinator and the second coordinator comparing a capability of the first coordinator and a capability of the second coordinator based on first coordinator capability information indicating the capability of the first coordinator and second coordinator capability information indicating the capability of the second coordinator; the second device disassociating from the second network based on a result of comparison and then associating with the first network; the second device transmitting second pairing information indicating that the second device is a device to perform pairing, to the first coordinator; and the first coordinator broadcasting third pairing information indicating that the first device is a device to perform pairing and the second pairing information.

According to an aspect of another exemplary embodiment, there is provided a computer-readable recording medium having recorded thereon a computer program for executing the method of performing pairing between a first device of a first network and a second device of a second network by using a first coordinator of the first network and a second coordinator of the second network, the method including: each of the first device and the second device comparing a capability of the first coordinator and a capability of the second coordinator based on first coordinator capability information indicating the capability of the first coordinator and second coordinator capability information indicating the capability of the second coordinator; the second device disassociating from the second network based on a result of comparison and then associating with the first network; the second device transmitting second pairing information indicating that the second device is a device to perform pairing, to the first coordinator; and the first coordinator broadcasting third pairing information indicating that the first device is a device to perform pairing and the second pairing information.

According to an aspect of another exemplary embodiment, there is provided a computer-readable recording medium having recorded thereon a computer program for executing the method of performing pairing between a first device of a first network and a second device of a second network by using a first coordinator of the first network and a second coordinator of the second network, the method including: each of the first coordinator and the second coordinator comparing a first random number generated by the first device and a second random number generated by the second device; the second device disassociating from the second network based on a result of comparison and then associating with the first network; the second device transmitting second pairing information indicating that the second device is a device to perform pairing, to the first coordinator; and the first coordinator broadcasting third pairing information indicating that the first device is a device to perform pairing and the second pairing information.

According to an aspect of another exemplary embodiment, there is provided a computer-readable recording medium having recorded thereon a computer program for executing the method of performing pairing between a first device of a first network and a second device of a second network by using a first coordinator of the first network and a second coordinator of the second network, the method including: each of the first device and the second device comparing a first random number generated by the first device and a second random number generated by the second device; the second device disassociating from the second network based on a result of comparison and then associating with the first network; the second device transmitting second pairing information indicating that the second device is a device to perform pairing, and the second random number to the first coordinator; and the first coordinator broadcasting third pairing information indicating that the first device is a device to perform pairing, the second pairing information, the first random number, and the second random number.

According to an aspect of another exemplary embodiment, there is provided a computer-readable recording medium having recorded thereon a computer program for executing the method of performing pairing between a first coordinator of a first network and a second coordinator of a second network, the method including: the second coordinator broadcasting a beacon including fourth pairing information indicating that the second coordinator is a device to perform pairing, or the fourth pairing information; the first coordinator broadcasting a beacon including first pairing information indicating that the first coordinator is a device to perform pairing, or the first pairing information; deciding a device to exit a network to which the first coordinator or the second coordinator belongs, between the first coordinator and the second coordinator; and the second coordinator disassociating from the second network based on a decision and then associating with the first network.

BRIEF DESCRIPTION OF THE DRAWINGS

The above and other features and advantages will become more apparent by describing in detail exemplary embodiments with reference to the attached drawings in which:

FIG. 15 is a flowchart illustrating a method of performing pairing between devices that belong to different networks, according to another exemplary embodiment;

FIG. 16 is a flowchart illustrating a method of performing pairing between coordinators that belong to different networks, according to an exemplary embodiment;

FIG. 17 is a flowchart illustrating a method of performing pairing between coordinators that belong to different networks, according to another exemplary embodiment; and FIG. 18 is a flowchart illustrating a method of performing pairing between coordinators that belong to different networks, according to another exemplary embodiment.

DETAILED DESCRIPTION OF EXEMPLARY EMBODIMENTS

Exemplary embodiments will now be described more fully with reference to the accompanying drawings. Expressions such as "at least one of," when preceding a list of elements, modify the entire list of elements and do not modify the individual elements of the list.

Figure 1:
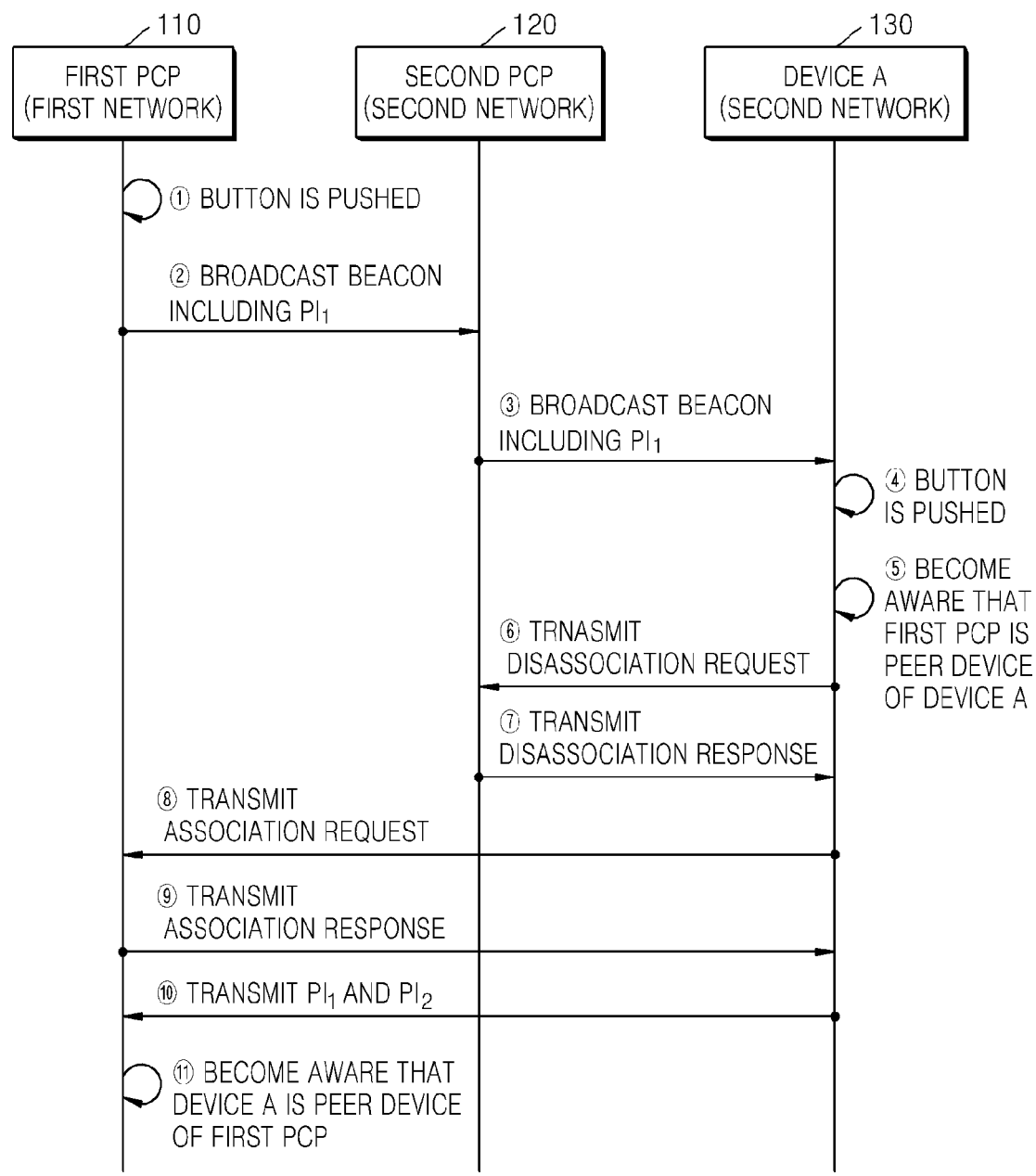
FIG. 1 is a flowchart illustrating a method of performing pairing between a coordinator and a device that belong to different networks, according to an exemplary embodiment.

FIG. 1 is a flowchart illustrating a method of performing pairing between a coordinator and a device that belong to different networks, according to an exemplary embodiment.

Hereinafter, it is assumed that a network to which a coordinator or a device belongs is referred to as a Personal Basic Service Set (PBSS) network. The PBSS network refers to a network in which direct communication between devices is basically performed without a coordinator corresponding to an access point (AP) of a Basic Service Set (BSS) network. The coordinator may be referred to as a PBSS Control Point (PCP). In the following drawings, the coordinator is indicated by PCP.

The difference between the BSS network and the PBSS network is that, in the BSS network, an AP and devices are clearly differentiated from each other, such that a device to be used as an AP and a device to be used as a device in a network can be determined. However, in the PBSS network, devices can also operate as a PCP, such that it is relatively more difficult to differentiate a device to be used as a PCP and a device to be used as a device in a network from each other.

In addition, the PBSS network may be considered a similar network to a Wireless Personal Area Network (WPAN) system. Unlike the WPAN system that is not connected to an external network, the PBSS network may be connected to the external network. In addition, the PBSS network may support communication in a 60 GHz frequency band.

Also, FIG. 1 illustrates a first PCP 110 that belongs to a first network, and a second PCP 120 and a device A 130 that belong to a second network. For convenience of explanation, other devices that belong to the second network are omitted, and it is understood that any number of devices may be included in the second network. In addition, the indications "first network" and "second network" in the following drawings represent that devices belong to the first network or the second network, respectively.

In a first operation, a button for instructing to perform pairing is pushed by a user of the first PCP 110.

In a second operation, the first PCP 110 broadcasts a beacon including first pairing information $PI_1$ indicating that the first PCP 110 is a device to perform pairing.

Although FIG. 1 illustrates that the beacon including the first pairing information $PI_1$ is broadcasted only to the second PCP 120 for convenience of explanation, it is understood that the beacon including the first pairing information $PI_1$ is broadcasted to all devices that belong to the first network.

Also, in FIG. 1, the second PCP 120 may receive the beacon broadcasted by the first PCP 110, and the device A 130 does not receive the beacon broadcasted by the first PCP 110. For example, if the device A 130 is disposed at a distant position too far to receive the beacon broadcasted by the first PCP 110, the device A 130 may not receive the beacon from the first PCP 110.

In this regard, the first pairing information $PI_1$ may include at least one of first PBC information indicating that the button for instructing to perform pairing has been pushed in the first PCP 110, an MAC address of the first PCP 110, an identifier of the first PCP 110, an identifier regarding the first network that is a network to which the first PCP 110 belongs, coordinator role information indicating that the first PCP 110 is a coordinator of the first network, etc.

In another exemplary embodiment, instead of broadcasting the beacon including the first pairing information $PI_1$, the first PCP 110 may broadcast the first paring information $PI_1$ in one time period from among time periods in which data communication between the first PCP 110 and the device A 130 is performed, or may broadcast the first pairing information $PI_1$ in an announcement time period for notifying information in the first network.

In a third operation, the second PCP 120 broadcasts a beacon including the first pairing information $PI_1$.

In this regard, since the second PCP 120 and the device A 130 belong to the same network and are disposed close to each other, the device A 130 may receive the beacon including the first pairing information $PI_1$ broadcasted by the second PCP 120.

In other words, in the second and third operations, the second PCP 120 relays the first pairing information $PI_1$ from the first PCP 110 to the device A 130.

In a fourth operation, a button for instructing to perform pairing is pushed by a user of the device A 130.

In a fifth operation, the device A 130 that receives the first pairing information $PI_1$ becomes aware that the first PCP 110 is a peer device of the device A 130.

Also, a device to be paired may be referred to as a peer device, such as the device A 130 from among devices of the PBSS network.

In a sixth operation, the device A 130 transmits to the second PCP 120 a disassociation request to disassociate from the second network.

In a seventh operation, the second PCP 120 transmits to the device A 130 a disassociation response that approves the disassociation request.

Thus, the device A 130 disassociates from the second network.

In an eighth operation, the device A 130 transmits to the first PCP 110 an association request to associate with the first network.

In a ninth operation, the first PCP 110 transmits to the device A 130 an association response that approves the association request.

Thus, the device A 130 associates with the first network because, if the first PCP 110 and the device A 130 do not belong to the same network, even though pairing between the first PCP 110 and the device A 130 is completed, data cannot be transmitted therebetween.

In a tenth operation, the device A 130 transmits the first pairing information $PI_1$, and second pairing information $PI_2$ indicating that the device A 130 is a peer device to perform pairing, to the first PCP 110.

In this regard, the second pairing information $PI_2$ may include at least one of second PBC information indicating that a button for instructing to perform pairing has been pushed in the device A 130, an identifier of the device A 130, an MAC address of the device A 130, etc.

In an eleventh operation, the first PCP 110 that receives the first pairing information $PI_1$ and the second pairing information $PI_2$ from the device A 130 becomes aware that the device A 130 is a peer device of the first PCP 110.

If the first PCP 110 and the device A 130 become aware that they are devices to be paired with each other in first through eighth operations, pairing between the first PCP 110 and the device A 130 is completed. Since the first PCP 110 and the device A 130 of which a pairing therebetween is completed belong to the same network, data can be transmitted between the first PCP 110 and the device A 130.

If the first PCP 110 and the device A 130 belong to the same network but pairing therebetween is not completed or if pairing between the first PCP 110 and the device A 130 is completed but the first PCP 110 and the device A 130 do not belong to the same network, data cannot be transmitted between the first PCP 100 and the device A 130.

Although a method of performing pairing between devices according to the present exemplary embodiment has been described by using a Push Button method, it is understood that another exemplary embodiment is not limited thereto. For example, the user may also instruct to perform pairing to each of the first PCP 110 and the device A 130 by using a remote controller.

Figure 2:
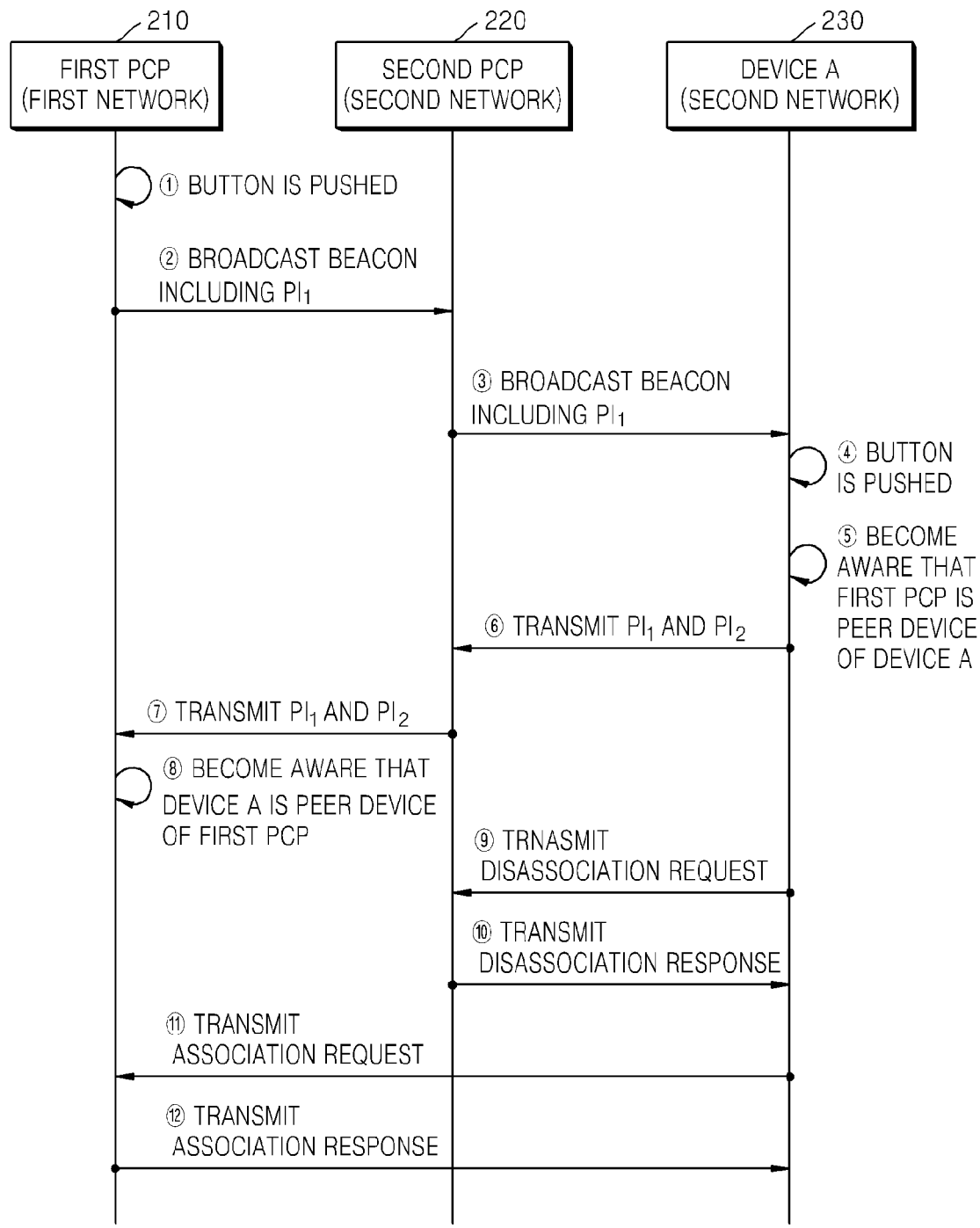
FIG. 2 is a flowchart illustrating a method of performing pairing between a coordinator and a device that belong to different networks, according to another exemplary embodiment.

FIG. 2 is a flowchart illustrating a method of performing pairing between a coordinator and a device that belong to different networks, according to another exemplary embodiment.

First through fifth operations illustrated in FIG. 2 are the same as those of FIG. 1 and thus, a description thereof is not provided here.

In a sixth operation, a device A 230 transmits first pairing information $PI_1$ and second pairing information $PI_2$ to a second PCP 220.

In a seventh operation, the second PCP 220 transmits the first pairing information $PI_1$ and the second pairing information $PI_2$ to a first PCP 210.

In an eighth operation, the first PCP 210 that receives the first pairing information $PI_1$ and the second pairing information $PI_2$, becomes aware that the device A 230 is a peer device of the first PCP 210.

In a ninth operation, the device A 230 transmits to the second PCP 220 a disassociation request to disassociate from the second network.

In a tenth operation, the second PCP 220 transmits to the device A 230 a disassociation response that approves the disassociation request.

In an eleventh operation, the device A 230 transmits to the first PCP 210 an association request to associate with the first network.

In a twelfth operation, the first PCP 210 transmits to the device A 230 an association response that approves the association request.

Figure 3:
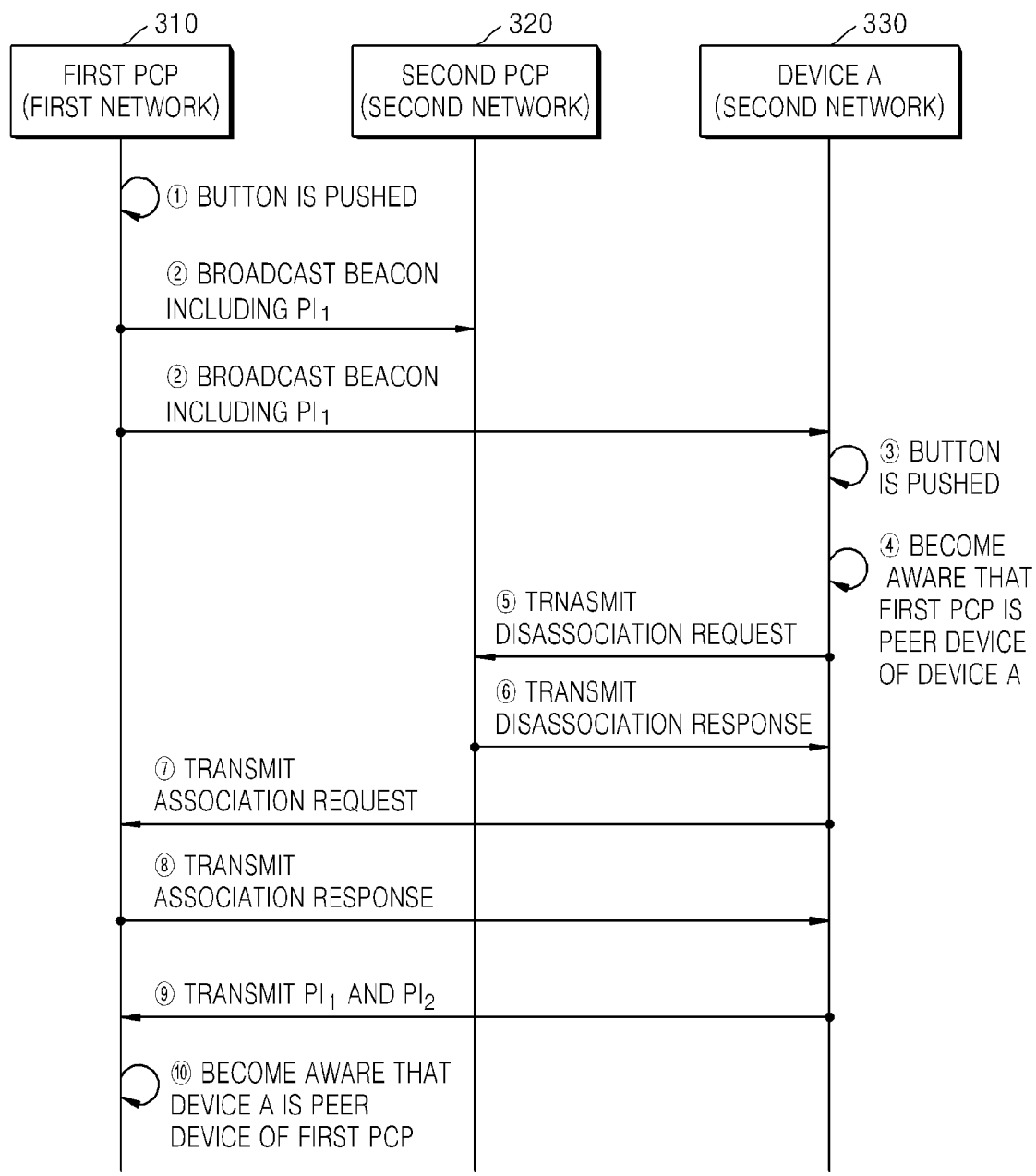
FIG. 3 is a flowchart illustrating a method of performing pairing between a coordinator and a device that belong to different networks, according to another exemplary embodiment.

FIG. 3 is a flowchart illustrating a method of performing pairing between a coordinator and a device that belong to different networks, according to another exemplary embodiment.

In a first operation, a button for instructing to perform pairing is pushed by a user of a first PCP 310.

In a second operation, the first PCP 310 broadcasts a beacon including first pairing information $PI_1$.

In this regard, since a device A 330 may receive the first pairing information $PI_1$ broadcasted by the first PCP 310, a second PCP 320 does not need to relay the first pairing information $PI_1$ from the first PCP 310 to the device A 330, as illustrated in FIGS. 1 and 2.

In a third operation, a button for instructing to perform pairing is pushed by the user of the device A 330.

In a fourth operation, the device A 330 that receives the first pairing information $PI_1$, becomes aware that the first PCP 310 is a peer device of the device A 330.

In a fifth operation, the device A 330 transmits to the second PCP 320 a disassociation request to disassociate from the second network.

In a sixth operation, the second PCP 320 transmits to the device A 330 a disassociation response that approves the disassociation request.

In an eleventh operation, the device A 330 transmits to the first PCP 310 an association request to associate with the first network.

In an eighth operation, the first PCP 310 transmits to the device A 330 an association response that approves the association request.

In a ninth operation, the device A 330 transmits the first pairing information $PI_1$ and the second pairing information $PI_2$ to the first PCP 310.

In a tenth operation, the first PCP 310 that receives the first pairing information $PI_1$ and the second pairing information $PI_2$ from the device A 330, becomes aware that the device A 330 is a peer device of the first PCP 310.

Figure 4:
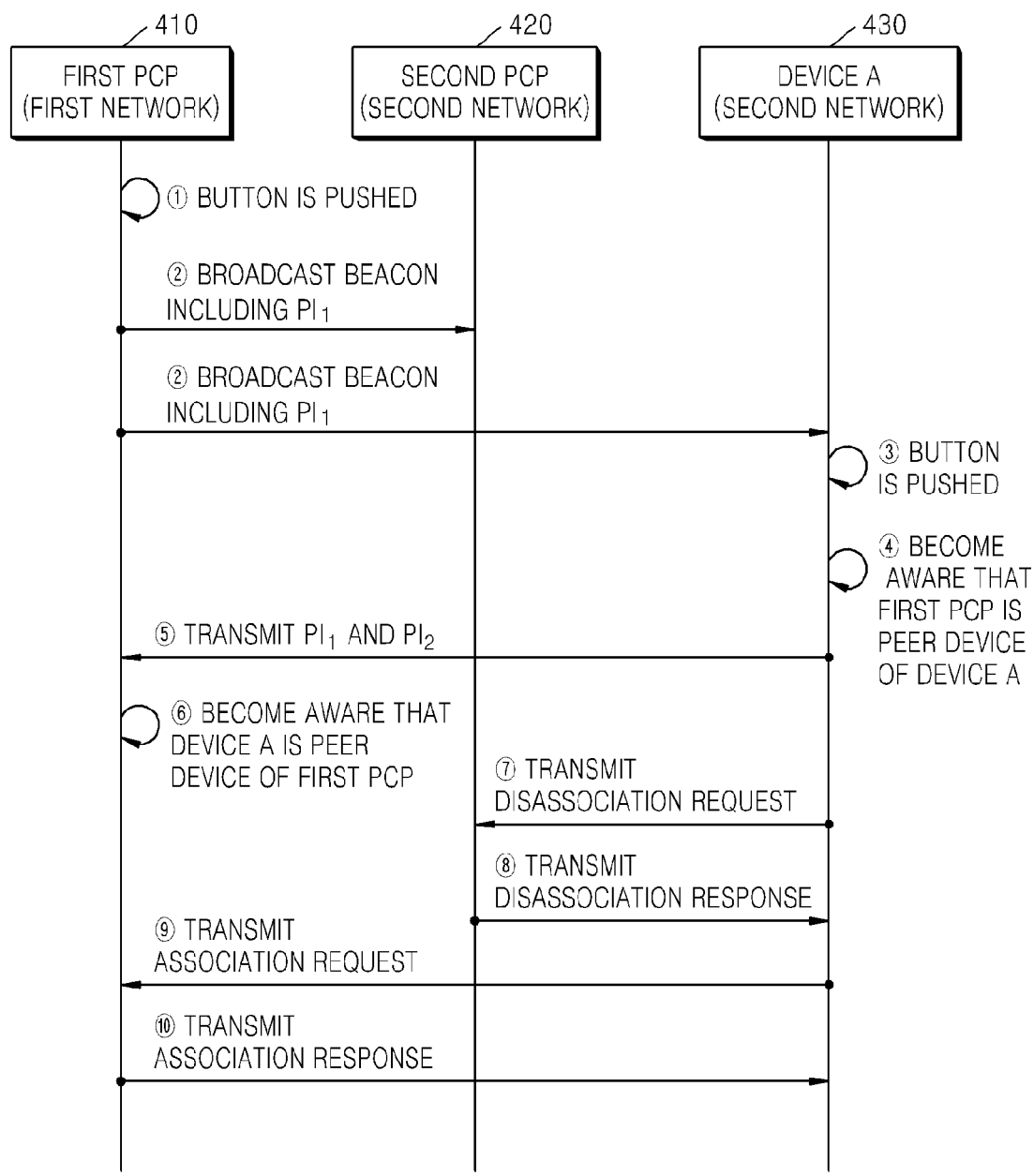
FIG. 4 is a flowchart illustrating a method of performing pairing between a coordinator and a device that belong to different networks, according to another exemplary embodiment.

FIG. 4 is a flowchart illustrating a method of performing pairing between a coordinator and a device that belong to different networks, according to another exemplary embodiment.

First through fourth operations illustrated in FIG. 4 are the same as those of FIG. 3 and thus, a description thereof is not provided here.

In a fifth operation, a device A 430 transmits the first pairing information $PI_1$ and the second pairing information $PI_2$ to the first PCP 410.

In a sixth operation, the first PCP 410 that receives the first pairing information $PI_1$ and the second pairing information $PI_2$ from the device A 430, becomes aware that the device A 430 is a peer device of the first PCP 410.

In a seventh operation, the device A 430 transmits to a second PCP 420 a disassociation request to disassociate from the second network.

In an eighth operation, the second PCP 420 transmits to the device A 430 a disassociation response that approves the disassociation request.

In a ninth operation, the device A 430 transmits to the first PCP 410 an association request to associate with the first network.

In a tenth operation, the first PCP 410 transmits to the device A 430 an association request that approves the association request.

In the above-described exemplary embodiments, a case where the devices A 130, 230, 330, and 430 illustrated in FIGS. 1 through 4 receive a beacon within a predetermined amount of time has been described. However, it is understood that another exemplary embodiment is not limited thereto. For example, according to another exemplary embodiment, the devices A 130, 230, 330, and 430 illustrated in FIGS. 1 through 4 may not receive a beacon within a predetermined amount of time. For this case, operations of the devices A 130, 230, 330, and 430 will now be described with reference to FIG. 5.

Figure 5:
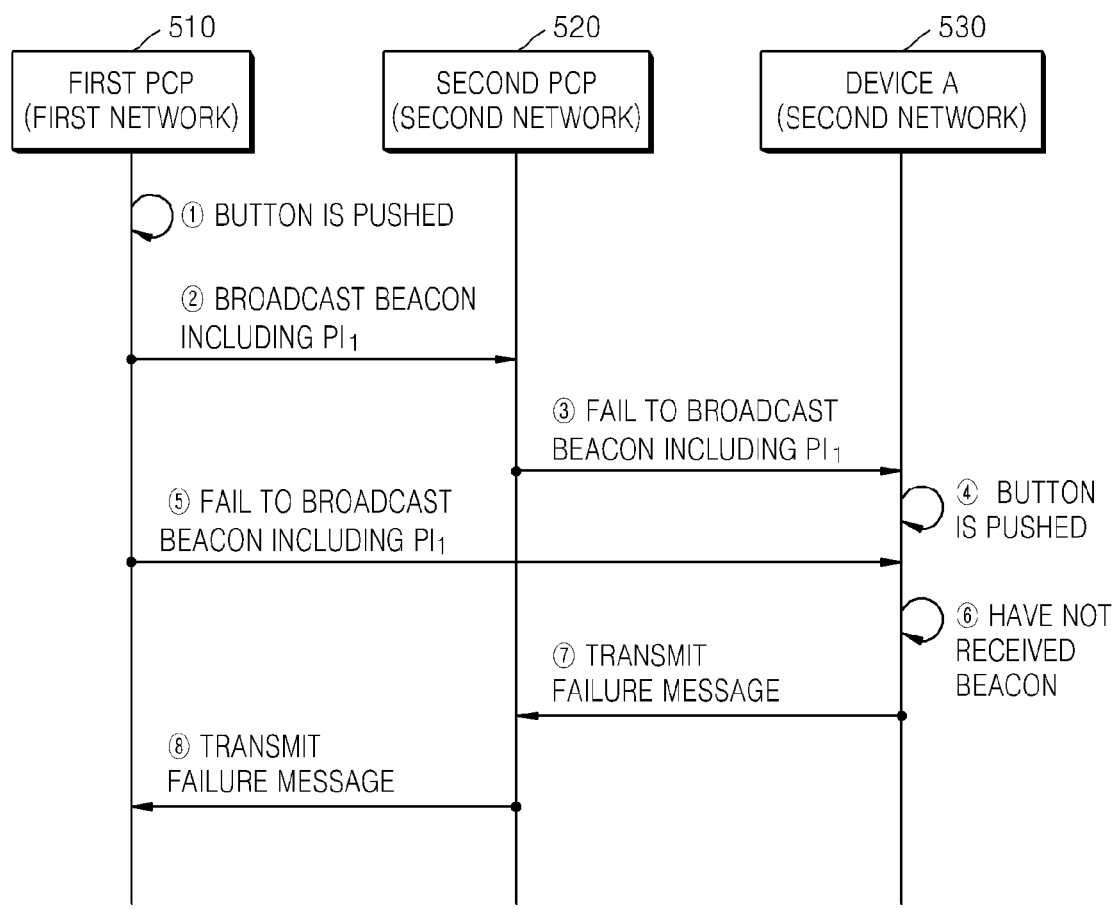
FIG. 5 is a flowchart for explaining an operation of a device that does not listen to a beacon from a coordinator within a predetermined amount of time, according to an exemplary embodiment.

FIG. 5 is a flowchart for explaining an operation of a device that does not listen to a beacon from a coordinator within a predetermined amount of time, according to an exemplary embodiment.

In a first operation, a button for instructing to perform pairing is pushed by a user of a first PCP 510.

In a second operation, the first PCP 510 broadcasts a beacon including first pairing information $PI_1$.

In this regard, a second PCP 520 may receive the beacon broadcasted by the first PCP 510, and a device A 530 does not receive the beacon.

In a third operation, the second PCP 520 fails to broadcast the beacon including the first pairing information $PI_1$.

For example, since a signal of the beacon including the first pairing information $PI_1$ to be broadcasted by the second PCP 520 is too weak, the device A 530 does not receive the beacon. Thus, the second PCP 520 may fail to broadcast the beacon.

In a fourth operation, a button for instructing to perform pairing is pushed by the user of the device A 530.

In a fifth operation, the first PCP 510 fails to broadcast the beacon including the first pairing information $PI_1$.

For example, since the device A 530 is disposed at a distant position too far to receive the beacon to be broadcasted by the first PCP 110, the device A 530 does not receive the beacon from the first PCP 510. Thus, the first PCP 110 may fail to broadcast the beacon.

In a sixth operation, the device A 530 becomes aware that the device A 530 has not received the beacon within a predetermined amount of time. For example, in a PBC method, pairing is performed only if another button is pushed within two minutes (120 seconds) after one button is pushed.

In a seventh operation, the device A 530 transmits a failure message to the second PCP 520.

In an eighth operation, the second PCP 520 transmits the failure message to the first PCP 510.

Figure 6:
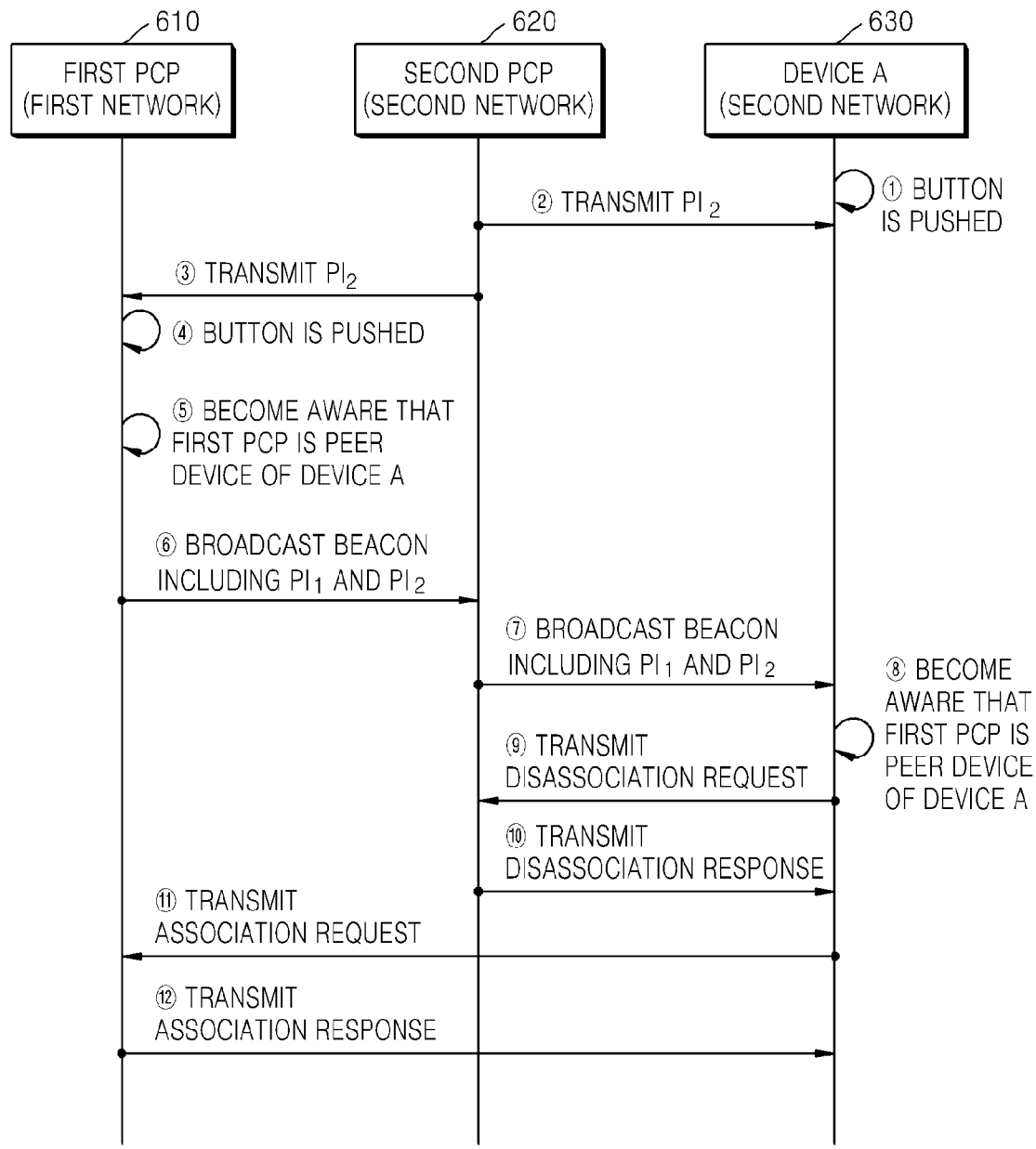
FIG. 6 is a flowchart illustrating a method of performing pairing between a coordinator and a device that belong to different networks, according to another exemplary embodiment.

FIG. 6 is a flowchart illustrating a method of performing pairing between a coordinator and a device that belong to different networks, according to another exemplary embodiment.

In a first operation, a button for instructing to perform pairing is pushed by a user of a device A 630.

In a second operation, the device A 630 transmits second pairing information $PI_2$ to a second PCP 620.

In a third operation, the second PCP 620 transmits the second pairing information $PI_2$ to a first PCP 610.

In a fourth operation, a button for instructing to perform pairing is pushed by the user of the first PCP 610.

In a fifth operation, the first PCP 610 that receives the second pairing information $PI_2$ from the second PCP 620, becomes aware that the device A 630 is a peer device of the first PCP 610.

In a sixth operation, the first PCP 610 broadcasts a beacon including the first pairing information $PI_1$ and the second pairing information $PI_2$.

In this regard, the second PCP 620 may receive the beacon broadcasted by the first PCP 610, and the device A 630 does not receive the beacon.

In a seventh operation, the second PCP 620 broadcasts the beacon including the first pairing information $PI_1$ and the second pairing information $PI_2$.

In an eighth operation, the device A 630 that receives the first pairing information $PI_1$, becomes aware that the first PCP 610 is a peer device of the first PCP 610.

In a ninth operation, the device A 630 transmits to the second PCP 620 a disassociation request to disassociate from the second network.

In a tenth operation, the second PCP 620 transmits to the device A 630 a disassociation response that approves the disassociation request.

In an eleventh operation, the device A 630 transmits to the first PCP 610 an association request to associate with the first network.

In a twelfth operation, the first PCP 610 transmits to the device A 630 an association response that approves the association request.

Figure 7:
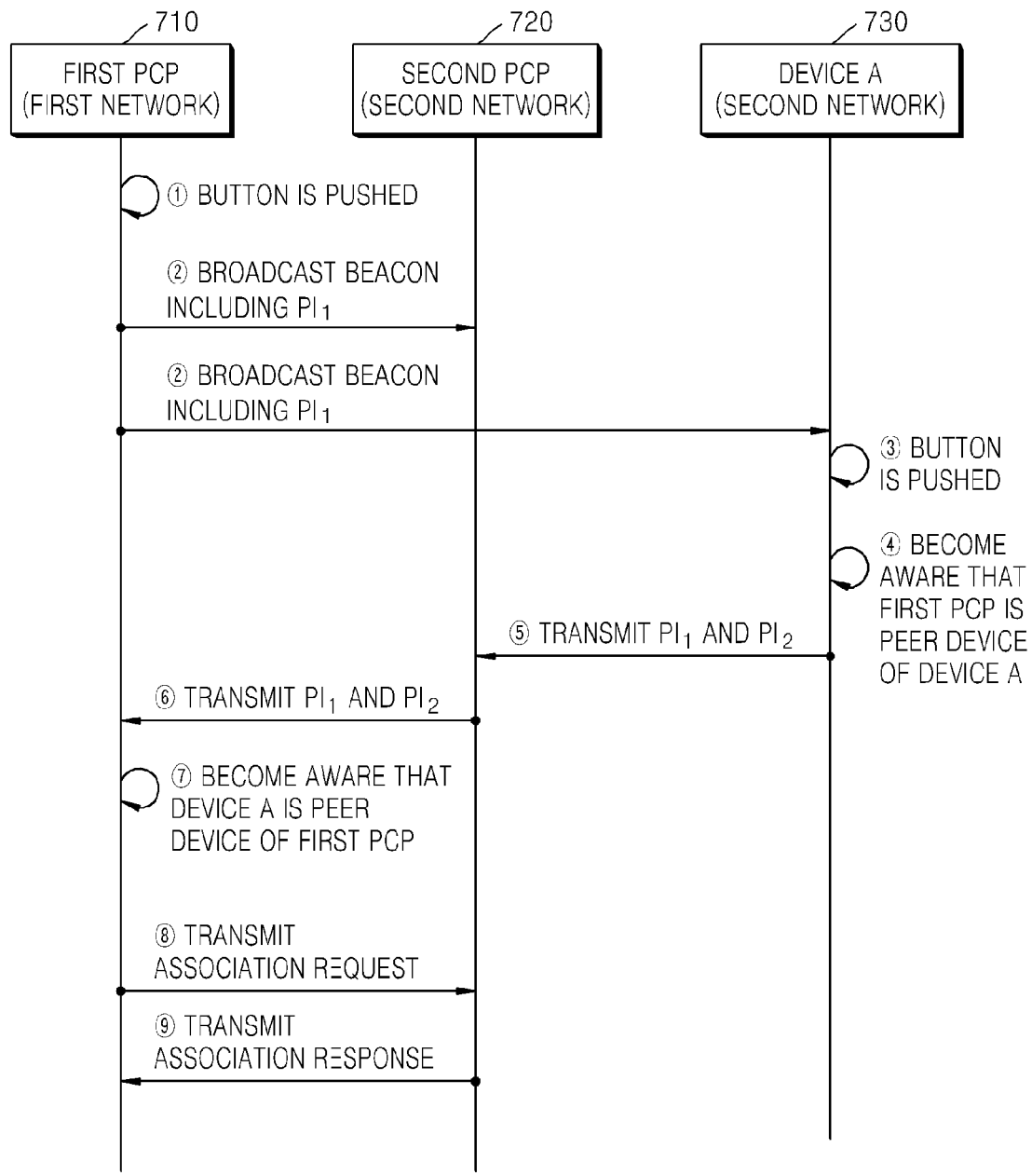
FIG. 7 is a flowchart illustrating a method of performing pairing between a coordinator and a device that belong to different networks, according to another exemplary embodiment.

FIG. 7 is a flowchart illustrating a method of performing pairing between a coordinator and a device that belong to different networks, according to another exemplary embodiment.

In a first operation, a button for instructing to perform pairing is pushed by a user of a first PCP 710.

In a second operation, the first PCP 710 broadcasts a beacon including first pairing information $PI_1$.

In this regard, both a second PCP 720 and a device A 730 may receive the first pairing information $PI_1$ broadcasted by the first PCP 710.

In a third operation, a button for instructing to perform pairing is pushed by the user of a device A 730.

In a fourth operation, the device A 730 that receives the first pairing information $PI_1$, becomes aware that the first PCP 710 is a peer device of the device A 730.

In a fifth operation, the device A 730 transmits the first pairing information $PI_1$ and the second pairing information $PI_2$ to the second PCP 720.

In a sixth operation, the second PCP 720 transmits the first pairing information $PI_1$ and the second pairing information $PI_2$ to the first PCP 710.

In a seventh operation, the first PCP 710 that receives the first pairing information $PI_1$ and the second pairing information $PI_2$ from the device A 730, becomes aware that the device A 730 is a peer device of the first PCP 710.

In an eighth operation, the first PCP 710 transmits an association request to associate with the second network, to the second PCP 720.

In a ninth operation, the second PCP 720 transmits an association response that approves the association request, to the first PCP 710.

Figure 8:
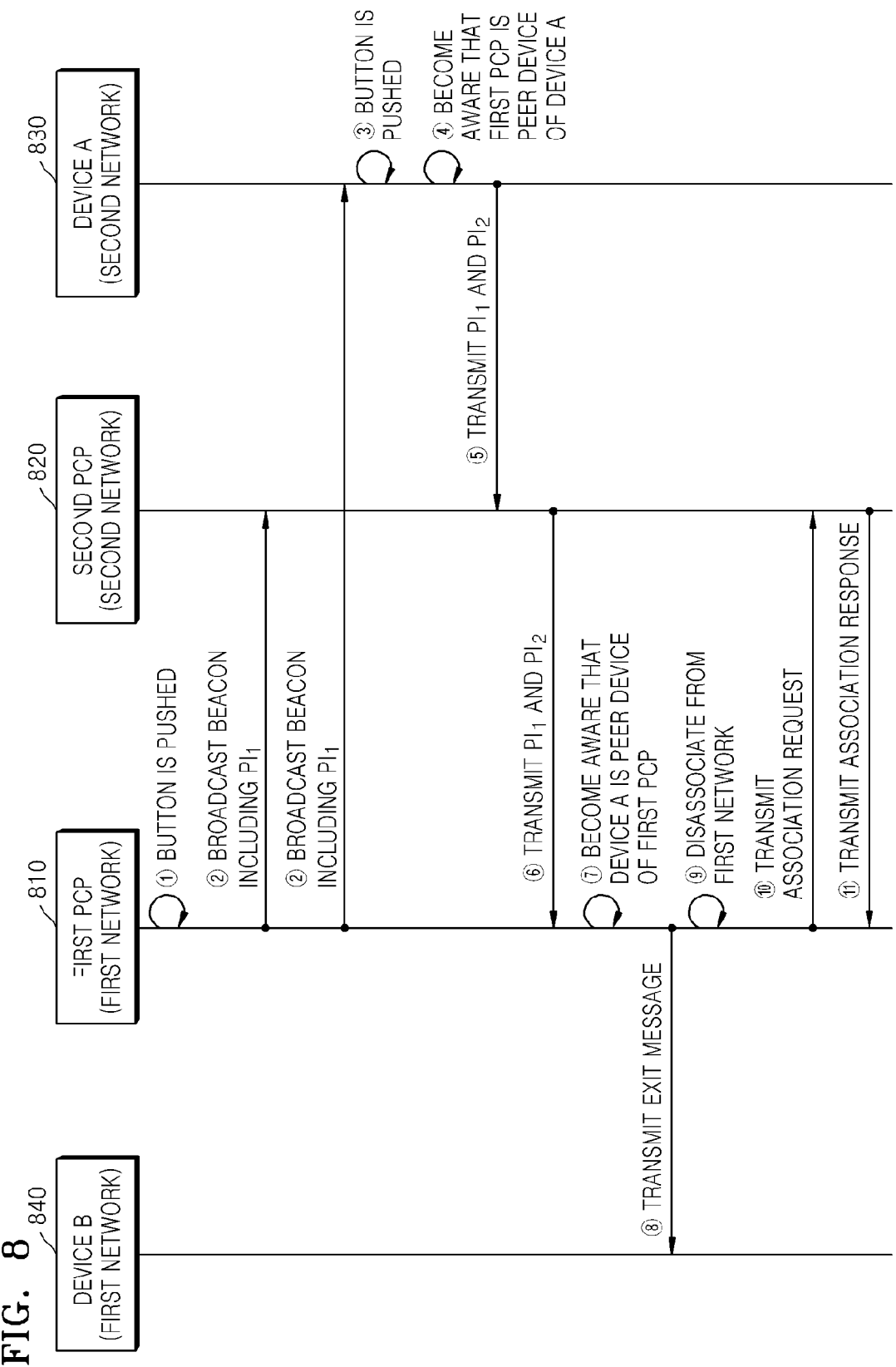
FIG. 8 is a flowchart illustrating a method of performing pairing between a coordinator and a device that belong to different networks, according to another exemplary embodiment.

FIG. 8 is a flowchart illustrating a method of performing pairing between a coordinator and a device that belong to different networks, according to another exemplary embodiment.

A device B 840 of a first network is further illustrated in FIG. 8. In FIG. 8, for convenience of explanation, only the device 840 is shown, though it is understood that a plurality of devices may be included in the first network. Also, first through seventh operations illustrated in FIG. 8 are the same as those of FIG. 7 and thus, a description thereof is not provided here.

In an eighth operation, a first PCP 810 transmits to the device B 840 an exit message indicating that the first PCP 810 plans to exit the first network.

In a ninth operation, the first PCP 810 disassociate from the first network.

In a tenth operation, the first PCP 810 transmits to a second PCP 820 an association request to associate with the second network.

In an eleventh operation, the second PCP 820 transmits to the first PCP 810 an association response that approves the association request.

Figure 9:
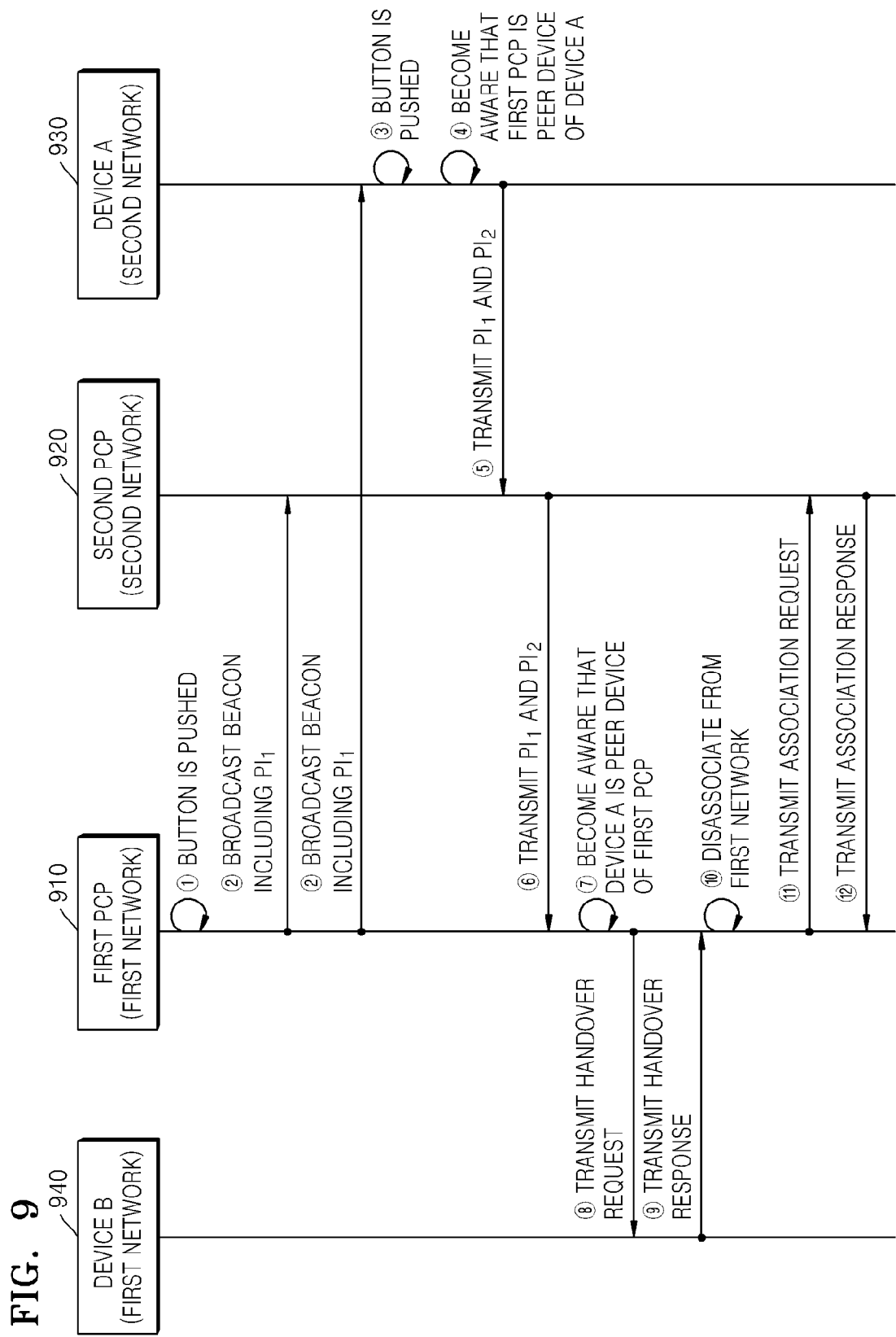
FIG. 9 is a flowchart illustrating a method of performing pairing between a coordinator and a device that belong to different networks, according to another exemplary embodiment.

FIG. 9 is a flowchart illustrating a method of performing pairing between a coordinator and a device that belong to different networks, according to another exemplary embodiment.

First through seventh operations illustrated in FIG. 9 are the same as those of FIG. 7 and thus, a description thereof is not provided here.

In an eighth operation, a first PCP 910 transmits a handover request to hand over a coordinator role of the first network, to a device B 940 from among devices of the first network.

In a ninth operation, the device B 940 transmits to the first PCP 910 a handover response that approves the handover request.

In a tenth operation, the first PCP 910 disassociates from the first network.

In an eleventh operation, the first PCP 910 transmits to the second PCP 920 an association request to associate with the second network.

In a twelfth operation, the second PCP 920 transmits to the first PCP 910 an association response that approves the association request.

Figure 10:
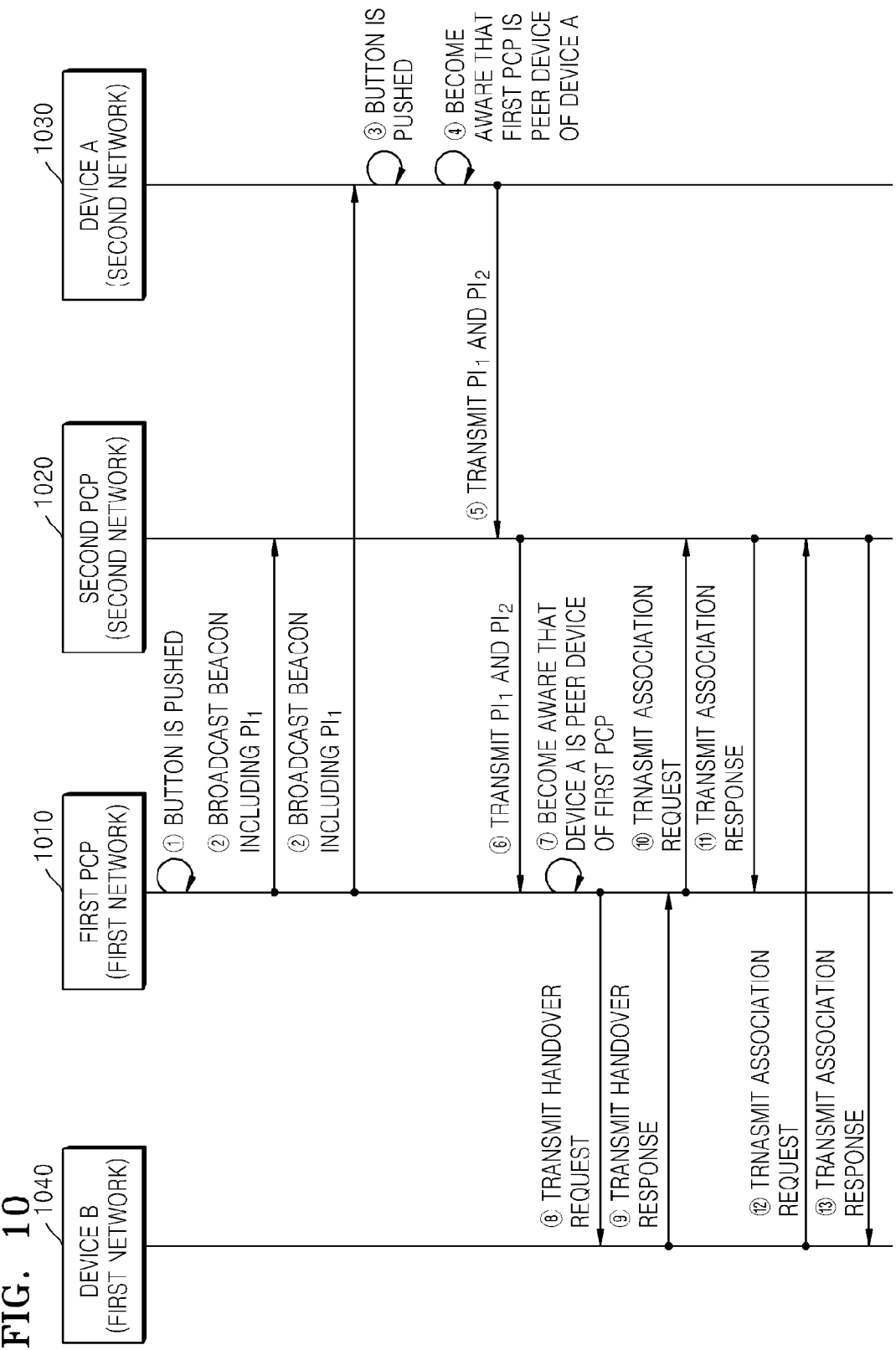
FIG. 10 is a flowchart illustrating a method of performing pairing between a coordinator and a device that belong to different networks, according to another exemplary embodiment.

FIG. 10 is a flowchart illustrating a method of performing pairing between a coordinator and a device that belong to different networks, according to another exemplary embodiment.

First through seventh operations illustrated in FIG. 10 are the same as those of FIG. 7 and thus, a description thereof is not provided here.

In an eighth operation, a first PCP 1010 transmits a movement request to move to the second network, to a device B 1040 from among devices of the first network.

In a ninth operation, the device B 1040 transmits a movement response that approves the movement request, to the first PCP 1010.

In a tenth operation, the first PCP 1010 transmits an association request to associate with the second network, to a second PCP 1020.

In an eleventh operation, the second PCP 1020 transmits an association response that approves the association request, to the first PCP 1010.

In a twelfth operation, the device B 1040 transmits an association request to associate with the second network, to the second PCP 1020.

In a thirteenth operation, the second PCP 1020 transmits an association response that approves the association request, to the device B 1040.

In the above-described exemplary embodiments, methods of performing pairing between a PCP and a device that belong to different networks have been described. Since the user sequentially selects two devices to be paired therebetween without differentiating whether the devices are a PCP or a general device or without recognizing a network to which the PCP or the device belongs, so as to automatically perform pairing, pairing between the devices can be easily performed.

Hereinafter, methods of performing pairing between devices that belong to different networks according to exemplary embodiments will be described with reference to FIGS. 11 through 15.

Figure 11:
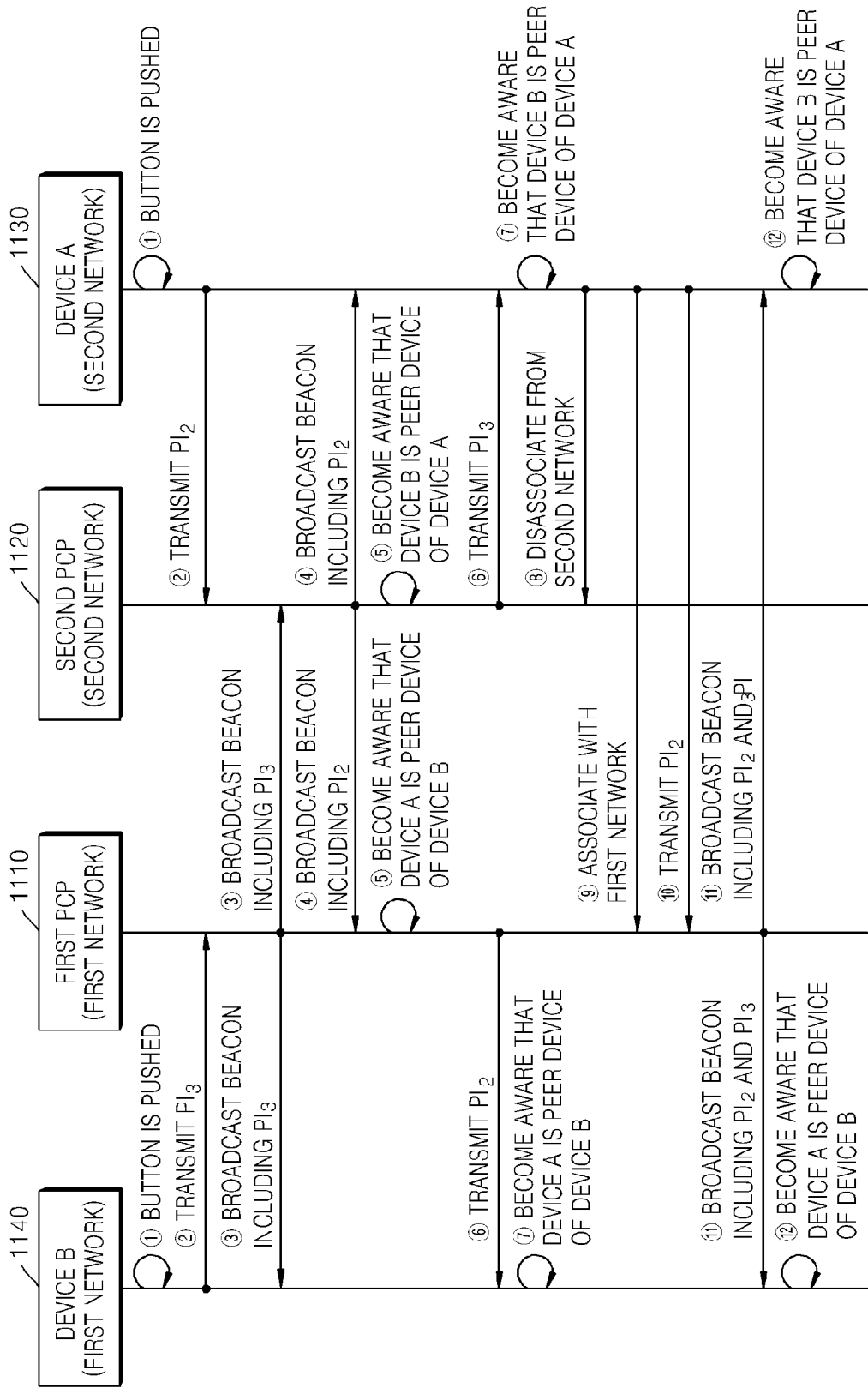
FIG. 11 is a flowchart illustrating a method of performing pairing between devices that belong to different networks, according to an exemplary embodiment.

FIG. 11 is a flowchart illustrating a method of performing pairing between devices that belong to different networks, according to an exemplary embodiment.

In a first operation, a button for instructing to perform pairing is pushed by a user of each of a device B 1140 and a device A 1130.

In a second operation, the device B 1140 transmits third pairing information $PI_3$ indicating that the device B 1140 is a device to perform pairing, to a first PCP 1110, and the device A 1130 transmits second pairing information $PI_2$ indicating that the device A 1130 is a peer device to perform pairing, to the second PCP 1120.

In this regard, the third pairing information $PI_3$ may include at least one of third PBC information indicating that the button for instructing to perform pairing has been pushed in the device B 1140, an identifier of the device B 1140, an MAC address of the device B 1140, and information indicating that the device B 1140 is not a coordinator but a general device, etc.

In a third operation, the first PCP 1110 broadcasts a beacon including the third pairing information $PI_3$.

In this regard, the device B 1140 and the second PCP 1120 receive the third pairing information $PI_3$ but the device A 1130 does not receive the third pairing information $PI_3$. For example, since the device A 1130 does not belong to the same network as that of the first PCP 1110, the device A 1130 may not receive the third pairing information $PI_3$ broadcasted by the first PCP 1110.

In a fourth operation, the second PCP 1120 broadcasts a beacon including the second pairing information $PI_2$.

In this regard, the device A 1130 and the first PCP 1110 receive the second pairing information $PI_2$ but the device B 1140 does not receive the second pairing information $PI_2$.

In a fifth operation, the first PCP 1110 becomes aware that the device A 1130 is a peer device of the device B 1140, and the second PCP 1120 becomes aware that the device B 1140 is a peer device of the device A 1130.

In a sixth operation, the first PCP 1110 transmits the second pairing information $PI_2$ to the device B 1140, and the second PCP 1120 transmits the third pairing information $PI_3$ to the device A 1130.

In a seventh operation, the device A 1130 becomes aware that the device B 1140 is a peer device of the device A 1130, and the device B 1140 is a peer device of the device B 1140.

In an eighth operation, the device A 1130 disassociates from the second network.

In a ninth operation, the device A 1130 associates with the first network.

In a tenth operation, the device A 1130 transmits the second pairing information $PI_2$ to the first PCP 1110.

In an eleventh operation, the first PCP 1110 broadcasts a beacon including the second pairing information $PI_2$ and the third pairing information $PI_3$.

In this regard, since the device A 1130 belongs to the first network that is the same as that of the first PCP 1110, the device A 1130 may receive the beacon including the second pairing information $PI_2$ and the third pairing information $PI_3$.

In a twelfth operation, the device B 1140 becomes aware that the device A 1130 is a peer device of the device B 1140, and the device A 1130 is a peer device of the device A 1130.

Figure 12:
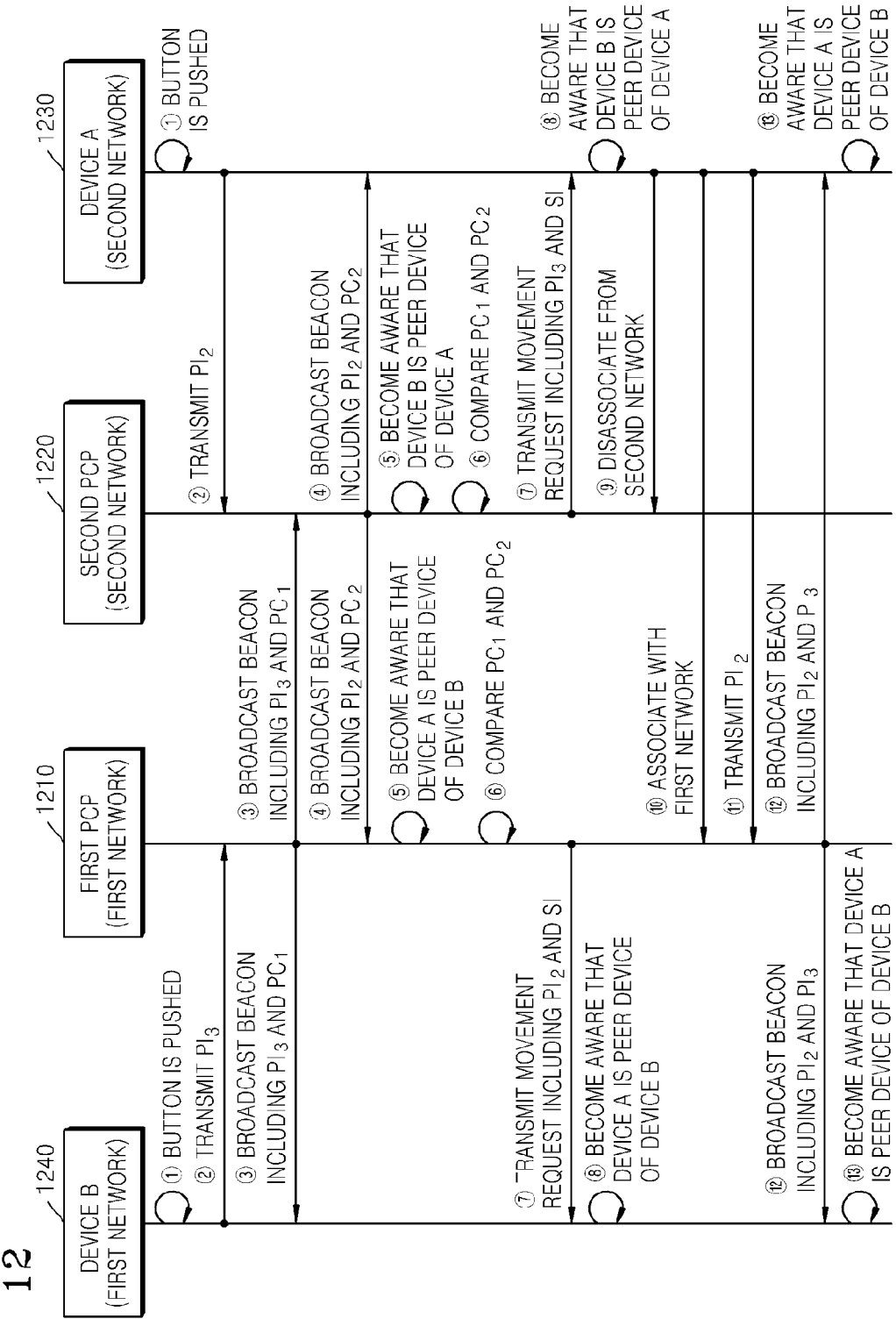
FIG. 12 is a flowchart illustrating a method of performing pairing between devices that belong to different networks, according to another exemplary embodiment.

FIG. 12 is a flowchart illustrating a method of performing pairing between devices that belong to different networks, according to another exemplary embodiment.

In a first operation, a button for instructing to perform pairing is pushed by a user of each of a device B 1240 and a device A 1230.

In a second operation, the device B 1240 transmits third pairing information $PI_3$ to a first PCP 1210, and the device A 1230 transmits second pairing information $PI_2$ to a second PCP 1220.

In a third operation, the first PCP 1210 broadcasts a beacon including the third pairing information $PI_3$ and first PCP capability information $(PC)_1$ indicating the capability of the first PCP 1210.

In this regard, the first PCP capability information $PC_1$ may include the maximum number of devices that can be controlled by the first PCP 1210, the number of devices that are being controlled by the first PCP 1210, and information regarding whether power is supplied to the first PCP 1210 by using a battery.

In another exemplary embodiment, information about devices that belong to the first network may be further included in the beacon broadcasted by the first PCP 1210, and the second PCP 1220 may be aware that the device B 1240 belongs to the first network through information about the devices.

In a fourth operation, the second PCP 1220 broadcasts a beacon including the second pairing information $PI_2$ and second PCP capability information $(PC)_2$ indicating the capability of the second PCP 1220.

In this regard, the second PCP capability information $PC_2$ may include the maximum number of devices that can be controlled by the second PCP 1220, the number of devices that are being controlled by the second PCP 1220, and information regarding whether power is supplied to the second PCP 1220 by using a battery.

In a fifth operation, the first PCP 1210 becomes aware that the device A 1230 is a peer device of the device B 1240, and the second PCP 1220 becomes aware that the device B 1240 is a peer device of the device A 1230.

In a sixth operation, each of the first PCP 1210 and the second PCP 1220 compares the first PCP capability information $PC_1$ and the second PCP capability information $PC_2$.

The first PCP 1210 and the second PCP 1220 compare the first PCP capability information $PC_1$ and the second PCP capability information $PC_2$, thereby deciding a coordinator having a better PCP capability between the first PCP 1210 and the second PCP 1220 as a selected coordinator. In this regard, the first PCP 1210 and the second PCP 1220 may decide the selected coordinator based on at least one of the maximum number of devices that can be controlled by each of the first PCP 1210 and the second PCP 1220, the number of devices that are being controlled by the first PCP 1210 and the second PCP 1220, and depending on whether power is supplied to the first PCP 1210 and the second PCP 1220 by charging batteries of the first PCP 1210 and the second PCP 1220. In the current exemplary embodiment, the first PCP 1210 is decided as the selected coordinator. If the selected coordinator has been decided in this way, a device that belongs to a network to which the selected coordinator does not belong, i.e., the device A 1230 that belongs to the second network, is decided as a device to exit the second network.

In a seventh operation, the first PCP 1210 transmits to the device B 1240 a movement request that includes selected network information (SI) that is network information about the first network to which the selected coordinator belongs and the second pairing information $PI_2$ to request the device B 1240 to move to the first network, and the second PCP 1220 transmits to the device A 1230 a movement request that includes SI and the third pairing information $PI_3$ to request the device A 1230 to move to the first network.

In this regard, SI may include an identifier of the first network.

In addition, the movement request may further include information indicating that the device A 1230 has been decided as a device to move to the first network.

Since the device B 1240 already belongs to the first network, the device B 1240 does not need to perform any operation even though it receives the movement request. However, since the device A 1230 belongs to the second network, it moves to the first network through ninth through thirteenth operations that will be described below, in response to the received movement request.

In an eighth operation, the device B 1240 becomes aware that the device A 1230 is a peer device of the device B 1240, and the device A 1230 becomes aware that the device B 1240 is a peer device of the device A 1230.

In a ninth operation, the device A 1230 disassociates from the second network.

In another exemplary embodiment, before the device A 1230 disassociates from the second network, the device A 1230 may check whether it may receive the beacon from the first PCP (first coordinator) 1210.

In a tenth operation, the device A 1230 associates with the first network.

In another exemplary embodiment, the device A 1230 may associate with the first network and simultaneously may transmit the second pairing information $PI_2$ to the first PCP 1210.

In an eleventh operation, the device A 1230 transmits the second pairing information $PI_2$ to the first PCP 1210.

If, in the tenth operation, the device A 1230 associates with the first network and simultaneously transmits the second pairing information $PI_2$ to the first PCP 1210, the eleventh operation may be omitted.

In a twelfth operation, the first PCP 1210 broadcasts a beacon including the second pairing information $PI_2$ and the third pairing information $PI_3$.

In this regard, since the device A 1230 belongs to the first network that is the same as that of the first PCP 1210, the device A 1230 may receive the beacon including the second pairing information $PI_2$ and the third pairing information $PI_3$ broadcasted by the first PCP 1210.

In a thirteenth operation, the device B 1240 becomes aware that the device A 1230 is a peer device of the device B 1240, and the device A 1230 becomes aware that the device B 1240 is a peer device of the device A 1230.

Figure 13:
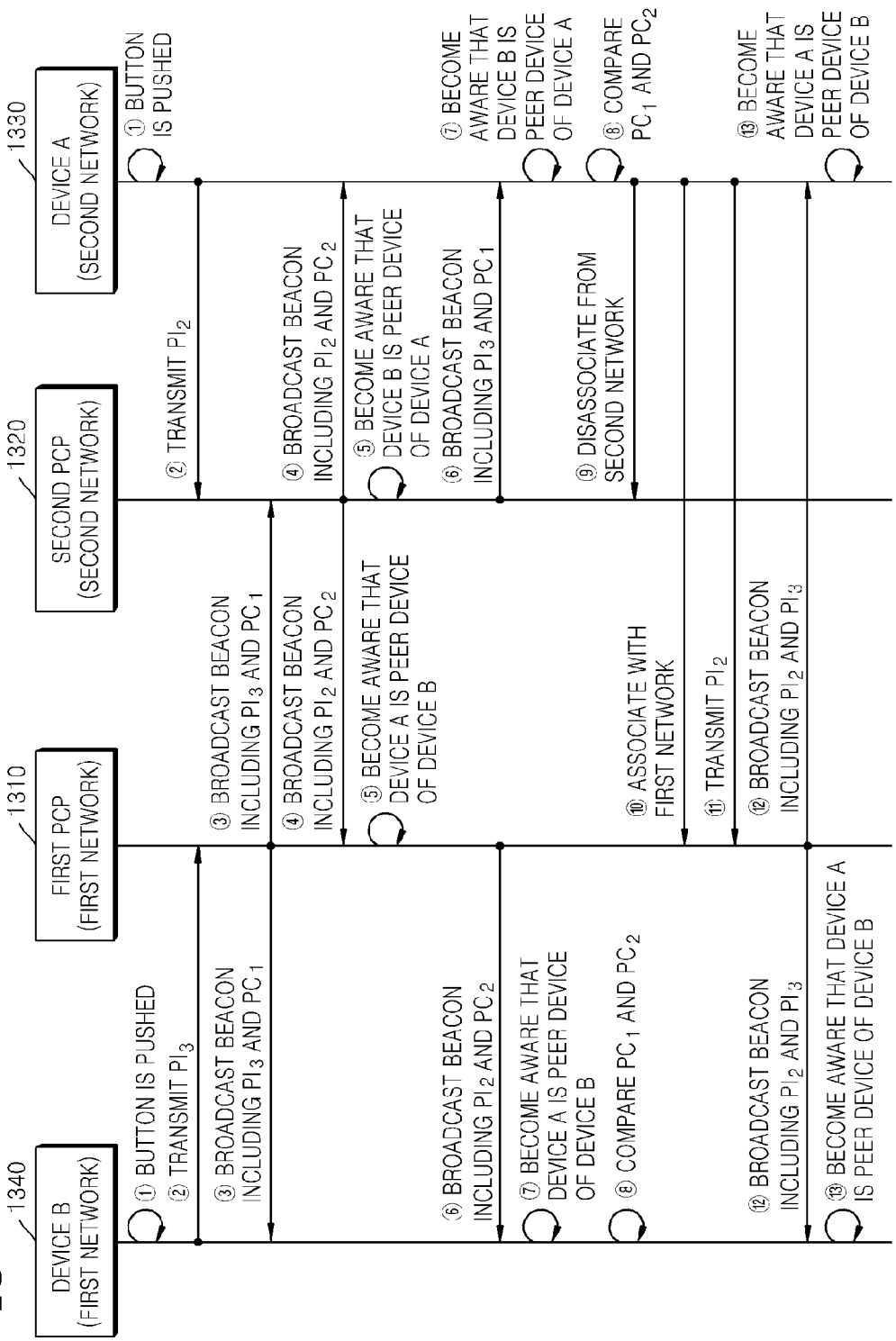
FIG. 13 is a flowchart illustrating a method of performing pairing between devices that belong to different networks, according to another exemplary embodiment.

FIG. 13 is a flowchart illustrating a method of performing pairing between devices that belong to different networks, according to another embodiment of the present invention.

First through fifth operations illustrated in FIG. 13 are the same as those of FIG. 12 and thus, a description thereof is not provided here.

In a sixth operation, a first PCP 1310 broadcasts a beacon including the second pairing information $PI_2$ and the second PCP capability information $PC_2$, and a second PCP 1320 broadcasts a beacon including the third pairing information $PI_3$ and the first PCP capability information $PC_1$.

In FIG. 13, the second pairing information $PI_2$ and the second PCP capability information $PC_2$ are transmitted only to a device B 1340. However, this is for convenience of explanation, and the second pairing information $PI_2$ and the second PCP capability information $PC_2$ are broadcasted by both the first PCP 1310 and the device B 1340. Thus, the first PCP 1310 transmits the second pairing information $PI_2$ and the second PCP capability information $PC_2$ to the device B 1340. This also applies to a case where the second PCP 1310 transmits the third pairing information $PI_3$ and the first PCP capability information $PC_1$.

In a seventh operation, the device B 1340 becomes aware that the device A 1330 is a peer device of the device B 1340, and the device A 1330 becomes aware that the device B 1340 is a peer device of the device A 1330.

In an eighth operation, each of the device B 1340 and the device A 1330 compares the first PCP capability information $PC_1$ and the second PCP capability information $PC_2$.

In the current exemplary embodiment, the device B 1340 and the device A 1330 compare the first PCP capability information $PC_1$ and the second PCP capability information $PC_2$, thereby deciding the first PCP 1310 as a selected coordinator having a more excellent capability as a coordinator.

In a ninth operation, the device A 1330 disassociates from the second network.

In a tenth operation, the device A 1330 associates with the first network.

In an eleventh operation, the device A 1330 transmits the second pairing information $PI_2$ to the first PCP 1310.

In a twelfth operation, the first PCP 1310 broadcasts a beacon including the second pairing information $PI_2$ and the third pairing information $PI_3$.

In a thirteenth operation, the device B 1340 becomes aware that the device A 1330 is a peer device of the device B 1340, and the device A 1330 becomes aware that the device B 1340 is a peer device of the device A 1330.

Figure 14:
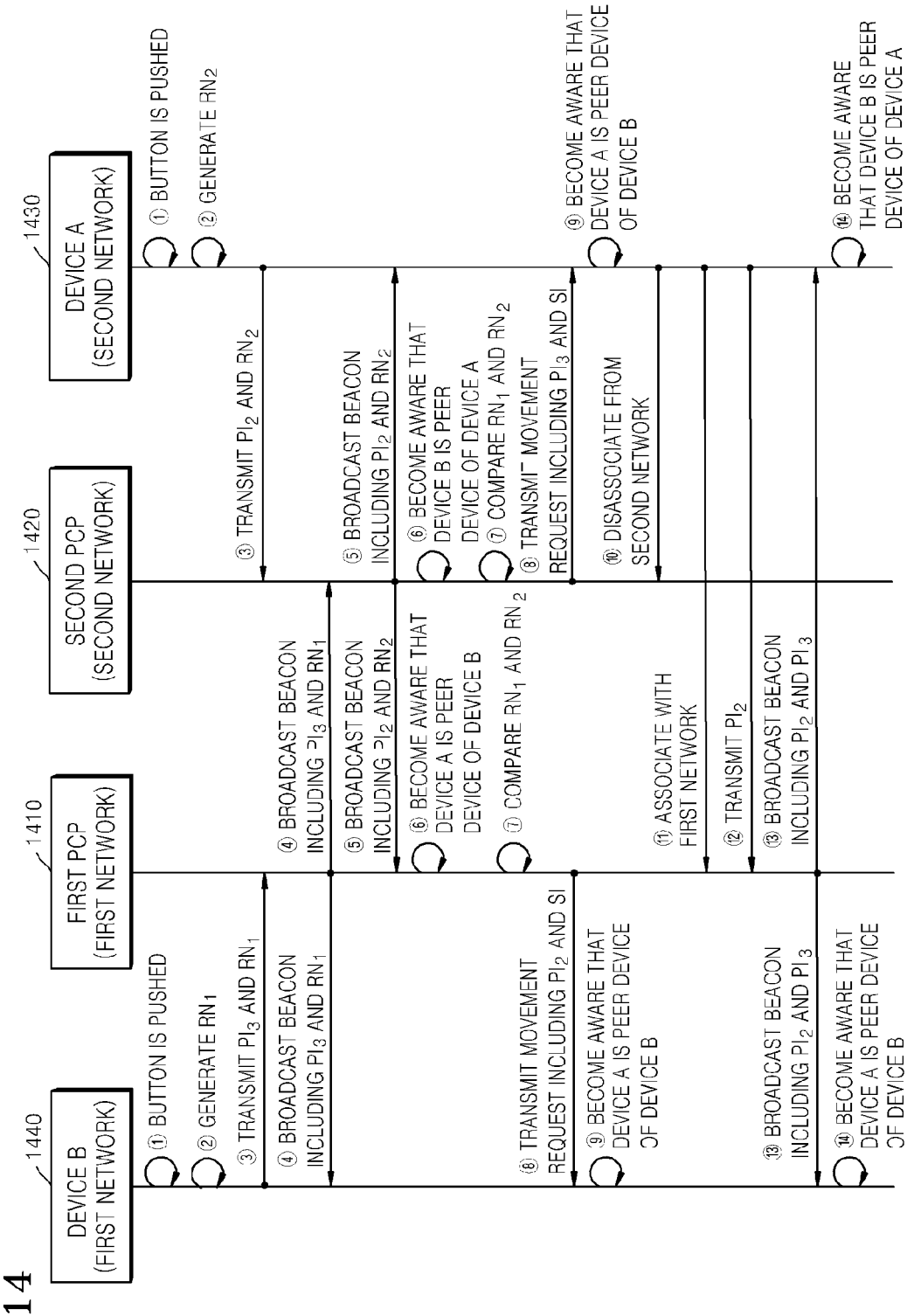
FIG. 14 is a flowchart illustrating a method of performing pairing between devices that belong to different networks, according to another exemplary embodiment.

FIG. 14 is a flowchart illustrating a method of performing pairing between devices that belong to different networks, according to another exemplary embodiment.

In a first operation, a button for instructing to perform pairing is pushed by a user of each of a device B 1440 and a device A 1430.

In a second operation, the device B 1440 generates a first random number $RN_1$, and the device A 1430 generates a second random number $RN_2$.

In a third operation, the device B 1440 transmits third pairing information $PI_3$ and the first random number $RN_1$ to the first PCP 1410, and the device A 1430 transmits second pairing information $PI_2$ and the second random number $RN_2$ to the second PCP 1420.

In a fourth operation, the first PCP 1410 broadcasts a beacon including the third pairing information $PI_3$ and the first random number $RN_1$.

In a fifth operation, the second PCP 1420 broadcasts a beacon including the second pairing information $PI_2$ and the second random number $RN_2$.

In a sixth operation, the first PCP 1410 becomes aware that the device A 1430 is a peer device of the device B 1440, and the second PCP 1420 becomes aware that the device B 1440 is a peer device of the device A 1430.

In a seventh operation, each of the first PCP 1410 and the second PCP 1420 compares the first random number $RN_1$ and the second random number $RN_2$.

The first PCP 1410 and the second PCP 1420 compare the first random number $RN_1$ and the second random number $RN_2$ in this way, thereby deciding a selected network between the first network and the second network. For example, a network to which a device for generating a random number having a relatively large value between the first random number $RN_1$ and the second random number $RN_2$ belongs, may be decided as a selected network. In the current exemplary embodiment, the first network is decided as the selected network.

In an eighth operation, the first PCP 1410 transmits to the device B 1440 a movement request including selected network information (SI) that is network information regarding the first network as the selected network and the second pairing information $PI_2$, and the second PCP 1420 transmits to the device A 1430 a movement request including SI and the third pairing information $PI_3$.

In another exemplary embodiment, the first PCP 1410 may transmit SI and the second pairing information $PI_2$ to the device B 1440, instead of transmitting the movement request, and the second PCP 1420 may also transmit SI and the third pairing information $PI_3$ to the device A 1430, instead of transmitting the movement request.

In a ninth operation, the device B 1440 becomes aware that the device A 1430 is a peer device of the device B 1440, and the device A 1430 becomes aware that the device B 1440 is a peer device of the device A 1430.

In a tenth operation, the device A 1430 disassociates from the second network.

In an eleventh operation, the device A 1430 associates with the first network.

In another embodiment, the device A 1430 may associate with the first network and simultaneously may transmit the second pairing information $PI_2$ and the second random number $RN_2$ to the first PCP 1410.

In a twelfth operation, the device A 1430 transmits the second pairing information $PI_2$ to the first PCP 1410.

If, in the eleventh operation, the device A 1430 associates with the first network and simultaneously transmits the second pairing information $PI_2$ and the second random number $RN_2$ to the first PCP 1410, the eleventh operation may be omitted.

In a thirteenth operation, the first PCP 1410 broadcasts a beacon including the second pairing information $PI_2$ and the third pairing information $PI_3$.

In a fourteenth operation, the device B 1440 becomes aware that the device A 1430 is a peer device of the device B 1440, and the device A 1430 becomes aware that the device B 1440 is a peer device of the device A 1430.

FIG. 15 is a flowchart illustrating a method of performing pairing between devices that belong to different networks, according to another exemplary embodiment.

First through sixth operations illustrated in FIG. 15 are the same as those of FIG. 14 and thus, a description thereof is not provided here.

In a seventh operation, the first PCP 1510 broadcasts a beacon including second pairing information $PI_2$ and a second random number $RN_2$, and the second PCP 1520 broadcasts a beacon including the third pairing information $PI_3$ and a first random number $RN_1$.

In an eighth operation, the device B 1540 becomes aware that the device A 1530 is a peer device of the device B 1540, and the device A 1530 becomes aware that the device B 1540 is a peer device of the device A 1530.

In a ninth operation, each of the device B 1540 and the device A 1530 compares the first random number $RN_1$ and the second random number $RN_2$.

The device B 1540 and the device A 1530 compare the first random number $RN_1$ and the second random number $RN_2$, thereby deciding a selected network between the first network and the second network. In the current embodiment, the first network is decided as the selected network.

In a tenth operation, the device A 1530 decides to become a member of the first network based on the result of comparison in the ninth operation.

In an eleventh operation, the device A 1530 disassociates from the second network.

In a twelfth operation, the device A 1530 associates with the first network.

In a thirteenth operation, the device A 1530 transmits the second pairing information $PI_2$ and the second random number $RN_2$ to the first PCP 1510.

In a fourteenth operation, the first PCP 1510 broadcasts a beacon including the second pairing information $PI_2$, the third pairing information $PI_3$, the first random number $RN_1$ and the second random number $RN_2$.

In a fifteenth operation, the device B 1540 becomes aware that the device A 1530 is a peer device of the device B 1540, and the device A 1530 becomes aware that the device B 1540 is a peer device of the device A 1530.

In the above-described exemplary embodiments, methods of performing pairing between the devices that belong to different networks have been described. In an exemplary embodiment, even when the devices belong to different networks, the user pushes each button of the devices so that pairing between the devices can be automatically performed.

Hereinafter, methods of performing pairing between coordinators that belong to different networks according to exemplary embodiments will be described with reference to FIGS. 16 through 18.

FIG. 16 is a flowchart illustrating a method of performing pairing between coordinators that belong to different networks, according to an exemplary embodiment.

In a first operation, a button for instructing to perform pairing is pushed by a user of a first PCP 1610.

In a second operation, the first PCP 1610 broadcasts a beacon including the first pairing information $PI_1$ indicating that the first PCP 1610 is a device to perform pairing.

In this regard, the second PCP 1620 receives the beacon broadcasted by the first PCP 1610 but a button for instructing to perform pairing is not pushed by the user of the second PCP 1620. Thus, the received beacon is ignored. Thus, the second PCP 1620 does not respond to the beacon received from the first PCP 1610.

In a third operation, the button for instructing to perform pairing is pushed by the user of the second PCP 1620.

In this way, if the button for instructing to perform pairing has been pushed in the second PCP 1620, the second PCP 1620 may respond to the beacon received from the first PCP 1610. In other words, only if the beacon is received after the button for instructing to perform pairing has been pushed in the second PCP 1620, the second PCP 1620 receives the received beacon as significant information.

In a fourth operation, the second PCP 1620 broadcasts a beacon including fourth pairing information $PI_4$ indicating that the second PCP 1620 is a peer device to perform pairing.

In this regard, the fourth pairing information $PI_4$ may include at least one of fourth PBC information indicating that the button for instructing to perform pairing has been pushed in the second PCP 1620, an identifier of the second PCP 1620, an MAC address of the second PCP 1620, coordinator role information indicating that the second PCP 1620 is a coordinator of the second network, etc.

In a fifth operation, the first PCP 1610 rebroadcasts the beacon including the first pairing information $PI_1$.

In FIG. 16, the beacon including the first pairing information $PI_1$ is transmitted twice, i.e., in the second operation and in the fourth operation. However, it is understood that another exemplary embodiment is not limited thereto, and the beacon may be periodically broadcasted a number of times.

In a sixth operation, the first PCP 1610 becomes aware that the second PCP 1620 is a peer device of the first PCP 1610, and the second PCP 1620 becomes aware that the first PCP 1610 is a peer device of the second PCP 1620.

In a seventh operation, a device to exit a network is decided between the first PCP 1610 and the second PCP 1620.

In this regard, the first PCP 1610 and the second PCP 1620 may perform negotiation or transmit and receive information so as to decide the device to exit the network. For example, the first PCP 1610 and the second PCP 1620 may decide the device to exit the network based on the first PCP capability information $PC_1$ and the second PCP capability information $PC_2$ after transmitting and receiving the first PCP capability information $PC_1$ of the first PCP 1610 and the second PCP capability information $PC_2$ of the second PCP 1620.

In an eighth operation, the second PCP 1620 decides to become a member of the first network based on a decision in the seventh operation.

In a ninth operation, the second PCP 1620 transmits a handover request to hand over a coordinator role of the second network, to the device A 1630 from among devices of a second network.

In a tenth operation, the second PCP 1620 performs an operation of handing over the coordinator role of the second network to the device A.

In this regard, the tenth operation may include an operation of transmitting a handover response that approves the handover request, to the second PCP 1620 by using the device A 1630.

In an eleventh operation, the device A 1630 becomes a coordinator of the second network through handover in the tenth operation.

In a twelfth operation, the second PCP 1620 disassociates from the second network.

In a thirteenth operation, the second PCP 1620 associates with the first network.

In a fourteenth operation, the second PCP 1620 transmits the fourth pairing information $PI_4$ to the first PCP 1610.

In a fifteenth operation, the first PCP 1610 becomes aware that the second PCP 1620 is a peer device of the first PCP 1610.

FIG. 17 is a flowchart illustrating a method of performing pairing between coordinators that belong to different networks, according to another exemplary embodiment.

First through eighth operations illustrated in FIG. 17 are the same as those of FIG. 16 and thus, a description thereof is not provided here.

In a ninth operation, a second PCP 1720 transmits a movement request to move to a first network, to a device A 1730 from among devices that belong to a second network.

In a tenth operation, the second PCP 1720 associates with the first network.

In an eleventh operation, the device A 1730 associates with the first network.

In a twelfth operation, the second PCP 1720 transmits fourth pairing information $PI_4$ to a first PCP 1710.

In a thirteenth operation, the first PCP 1710 becomes aware that the second PCP 1720 is a peer device of the first PCP 1710.

FIG. 18 is a flowchart illustrating a method of performing pairing between coordinators that belong to different networks, according to another exemplary embodiment.

First through eight operations illustrated in FIG. 18 are the same as those of FIG. 16 and thus, a description thereof is not provided here.

In a ninth operation, a second PCP 1820 transmits to devices of the second network including a device A 1830 an exit message indicating that the second PCP 1820 plans to exit a second network.

In a tenth operation, the second PCP 1820 associates with the first network.

In an eleventh operation, the device A 1830 associates with the first network.

In a twelfth operation, the second PCP 1820 transmits the fourth pairing information PI$_4$ to a first PCP 1810.

In a thirteenth operation, the first PCP 1810 becomes aware that the second PCP 1820 is a peer device of the first PCP 1810.

In the above-described exemplary embodiments, methods of performing pairing between the coordinators that belong to different networks have been described. In an exemplary embodiment, even when the coordinators belong to different networks, the user pushes each button of the coordinators so that pairing between the coordinators can be automatically performed.

An exemplary embodiment can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. Moreover, any of the above-described devices may include a processor or microprocessor executing a computer program stored in a computer-readable medium.

While exemplary embodiments have been particularly shown and described above, it will be understood by those skilled in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of exemplary embodiments, but by the appended claims, and all differences within the scope will be construed as being included in the present invention.

What is claimed is:

1. A method of performing pairing between a first device of a first network and a peer device of a second network, the method being performed by the peer device, the method comprising:
    receiving first pairing information indicating that the first device is a coordinator of the first network, from the first device through a coordinator of the second network;
    determining the first device as the coordinator of the first network based on the first pairing information;
    disassociating from the second network;
    associating with the first network; and
    broadcasting second pairing information indicating that the peer device is a peer device to perform pairing, to the first device.

2. The method of claim 1, wherein the disassociating from the second network comprises:
    transmitting, to the coordinator, a disassociation request to disassociate from the second network; and
    receiving a disassociation response that approves the disassociation request from the coordinator.

3. The method of claim 1, wherein the associating with the first network comprises:
    transmitting, to the first device, an association request to associate with the first network; and
    receiving an association response that approves the association request from the first device.

4. The method of claim 1, wherein:
    the first pairing information comprises at least one of first Push Button Configuration (PBC) information indicating that a button for instructing to perform pairing has been pushed in the first device, and a media access control (MAC) address of the first device; and
    the second pairing information comprises at least one of second PBC information indicating that a button for instructing to perform pairing has been pushed in the peer device, and an MAC address of the peer device.

5. The method of claim 4, wherein the first pairing information further comprises at least one of an identifier of the first network and coordinator role information indicating that the first device is a coordinator of the first network.

6. A non-transitory computer-readable recording medium having recorded thereon a computer program for executing the method of claim 1.

7. The method of claim 1, wherein the second pairing information is broadcasted with the first pairing information to the first device.

8. A method of performing pairing between a first device of a first network and a peer device of a second network, the method being performed by a coordinator of the second network, the method comprising:
    relaying, from the first device to the peer device, first pairing information indicating that the first device is a device to perform pairing;
    receiving a disassociation request from the peer device; and
    transmitting a disassociation response to the peer device,
    wherein the peer device is disassociated from the second network and associated with the first network and
    wherein the first device is determined as the coordinator of the first network, by the peer device, based on the first pairing information.

9. The method of claim 8, further comprising:
    relaying the first pairing information and second pairing information indicating that the peer device is a peer device to perform pairing from the peer device to the first device.

10. A method of performing pairing between a first device of a first network and a peer device of a second network, the method being performed by the first device, the method comprising:
    broadcasting first pairing information indicating that the first device is a coordinator to perform pairing; and
    receiving second pairing information indicating that the peer device is a peer device to perform pairing,
    wherein the first pairing information is relayed from the first device to the peer device through a coordinator of the second network, and
    wherein the peer device is disassociated from the second network and associated with the first network and
    wherein the first device is determined as the coordinator of the first network, by the peer device, based on the first pairing information.

11. The method of claim 10, the method further comprises:
    receiving a failure message from the coordinator when the first paring information is not received by the peer device within a predetermined amount of time,
    wherein the failure message is relayed from the peer device to the first device via the coordinator.

12. The method of claim 10, wherein the second pairing information is received with the first pairing information to the first device.

13. A method of performing pairing between a first device of a first network and a peer device of a second network, the method being performed by the first device, the method comprising:
broadcasting first pairing information indicating that the first device is a coordinator of the first network to perform pairing;
receiving the first pairing information, and second pairing information indicating that the peer device is a peer device to perform pairing, from a coordinator of the second network;
transmitting, to the coordinator, an association request to associate with the second network;
receiving an association response that approves the association request from the coordinator; and
associating with the second network,
wherein the first device is determined as the coordinator of the first network, by the peer device, based on the first pairing information.

14. The method of claim 13, further comprising:
transmitting to a device that belongs to the first network, a handover request to hand over a coordinator role of the first network;
receiving a handover response that approves the handover request from a device that receives the handover request; and
disassociating from the first network.

15. The method of claim 13, further comprising:
transmitting to a device that belongs to the first network, a movement request to move to the second network; and
receiving a movement response that approves the movement request from a device of the first network that receives the movement request,
wherein the device that receives the movement request is associated with the second network.

16. A peer device of a second network configured to perform pairing, the peer device comprising:
a memory configured to store at least one program; and
a processor,
wherein, when the at least one program is executed by the processor, the peer device is configured to:
receive first pairing information indicating that a first device is a coordinator of the first network, from the first device through a coordinator of a second network, the peer device being associated with the second network;
determining the first device as the coordinator of the first network based on the first pairing information;
disassociate from the second network;
associate with the first network; and
broadcast second pairing information indicating that the peer device is a peer device to perform pairing to the first device.

17. The peer device of claim 16, wherein, when the at least one program is executed by the processor, the peer device is further configured to:
disassociate from the second network when the peer device transmits, to the coordinator, a disassociation request to disassociate from the second network and receives, from the coordinator, a disassociation response that approves the disassociation request.

18. The peer device of claim 16, wherein, when the at least one program is executed by the processor, the peer device is further configured to:
disassociate from the second network by:
transmitting, to the coordinator, a disassociation request to disassociate from the second network; and
receiving a disassociation response that approves the disassociation request from the coordinator.

19. The peer device of claim 16, wherein:
the first pairing information comprises at least one of first Push Button Configuration (PBC) information indicating that a button for instructing to perform pairing has been pushed in the first device, and a media access control (MAC) address of the first device; and
the second pairing information comprises at least one of second PBC information indicating that a button for instructing to perform pairing has been pushed in the peer device, and an MAC address of the peer device.

20. A coordinator of a second network configured to perform pairing, the coordinator comprising:
a memory configured to store at least one program; and
a processor,
wherein, when the at least one program is executed by the processor, the coordinator is configured to:
relay first pairing information indicating that a first device of a first network is a device to perform pairing, from a first device of a first network to a peer device of the second network;
receive a disassociation request from the peer device; and
transmit a disassociation response to the peer device,
wherein the peer device is disassociated from the second network and associated with the first network and
wherein the first device is determined as the coordinator of the first network, by the peer device, based on the first pairing information.

21. The coordinator of claim 20, wherein, when the at least one program is executed by the processor, the coordinator is further configured to:
relay first pairing information and the second pairing information indicating that the peer device is a peer device to perform pairing from the peer device to the first device.

22. A first device of a first network configured to perform pairing, the first device comprising:
a memory configured to store at least one program; and
a processor,
wherein, when the at least one program is executed by the processor, the first device is configured to:
broadcast first pairing information indicating that the first device is a device to perform pairing; and
receive second pairing information indicating that a peer device is the peer device to perform pairing, the peer device being associated with a second network,
wherein the first pairing information is relayed from the first device to the peer device through a coordinator of the second network,
wherein the peer device is disassociated from the second network and associated with the first network and
wherein the first device is determined as the coordinator of the first network, by the peer device, based on the first pairing information.

23. The first device of claim 22,
wherein, when the at least one program is executed by the processor, the first device is further configured to receive a failure message from the coordinator when the first paring information is not received by the peer device within a predetermined amount of time, wherein the failure message is relayed from the peer device to the first device via the coordinator.

* * * * *